(12) United States Patent
Allen et al.

(10) Patent No.: US 6,278,379 B1
(45) Date of Patent: Aug. 21, 2001

(54) SYSTEM, METHOD, AND SENSORS FOR SENSING PHYSICAL PROPERTIES

(75) Inventors: Mark G. Allen, Atlanta; Jennifer M. English, Kennesaw, both of GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 0 days.

(21) Appl. No.: 09/454,748

(22) Filed: Dec. 6, 1999

Related U.S. Application Data

(63) Continuation-in-part of application No. 09/054,011, filed on Apr. 2, 1998, now Pat. No. 6,111,520.

(51) Int. Cl.[7] .................................................. G08B 21/00
(52) U.S. Cl. ........................... 340/870.16; 340/870.17; 340/870.31; 340/870.28; 340/447; 340/449; 340/451; 340/584; 340/665; 340/521; 340/10.1; 374/120; 374/183; 374/184; 422/82.02; 331/66; 324/655; 73/774
(58) Field of Search ...................... 340/870.16, 870.17, 340/870.31, 647, 442, 449, 451, 584, 665, 521, 531, 10.1, 870.28; 374/120, 183, 184; 422/82.02; 331/66; 324/655; 73/774

(56) References Cited

U.S. PATENT DOCUMENTS

| | | | |
|---|---|---|---|
| 3,338,100 | * 8/1967 | Takami | 374/154 |
| 3,656,132 | * 4/1972 | Brumbelow | 340/870.28 |
| 4,127,110 | * 11/1978 | Bullara | 600/561 |
| 4,203,128 | * 5/1980 | Guckel et al. | 331/156 |
| 4,237,900 | * 12/1980 | Schulman et al. | 600/301 |
| 4,455,874 | * 6/1984 | Paros | 73/704 |
| 4,494,411 | * 1/1985 | Koschke et al. | 73/724 |
| 4,660,568 | * 4/1987 | Cosman | 600/561 |
| 4,744,248 | * 5/1988 | Stewart | 73/505 |
| 4,764,244 | * 8/1988 | Chitty et al. | 216/20 |
| 4,991,283 | * 2/1991 | Johnson et al. | 29/595 |
| 5,189,591 | * 2/1993 | Bernot | 361/283.4 |
| 5,260,683 | * 11/1993 | Tanaka et al. | 340/448 |
| 5,312,674 | * 5/1994 | Haertling et al. | 428/210 |
| 5,466,614 | * 11/1995 | Yakura et al. | 438/14 |
| 5,514,337 | * 5/1996 | Groger et al. | 422/82.08 |
| 5,514,832 | * 5/1996 | Dusablon, Sr. et al. | 174/15.1 |
| 5,544,399 | * 8/1996 | Bishop et al. | 92/25.41 |
| 5,576,224 | * 11/1996 | Yakura et al. | 438/381 |
| 5,610,340 | * 3/1997 | Carr et al. | 73/718 |
| 5,731,754 | * 3/1998 | Lee, Jr. et al. | 340/447 |
| 5,770,803 | * 6/1998 | Saito | 73/777 |

* cited by examiner

Primary Examiner—Benjamin C. Lee
(74) Attorney, Agent, or Firm—Thomas, Kayden, Horstemeyer & Risley, L.L.P.

(57) ABSTRACT

Several sensors are provided for determining one of a number of physical roperties including pressure, temperature, chemical species, and other physical conditions. In general, the sensors feature a resonant circuit with an inductor coil which is electromagnetically coupled to a transmitting antenna. When an excitation signal is applied to the antenna, a current is induced in the sensor circuit. This current oscillates at the resonant frequency of the sensor circuit. The resonant frequency and bandwidth of the sensor circuit is determined using an impedance analyzer, a transmitting and receiving antenna system, or a chirp interrogation system. The resonant frequency may further be determined using a simple analog circuit with a transmitter. The sensors are constructed so that either the resonant frequency or bandwidth of the sensor circuit, or both, are made to depend upon the physical properties such as pressure, temperature, presence of a chemical species, or other condition of a specific environment. The physical properties are calculated from the resonant frequency and bandwidth determined.

64 Claims, 33 Drawing Sheets

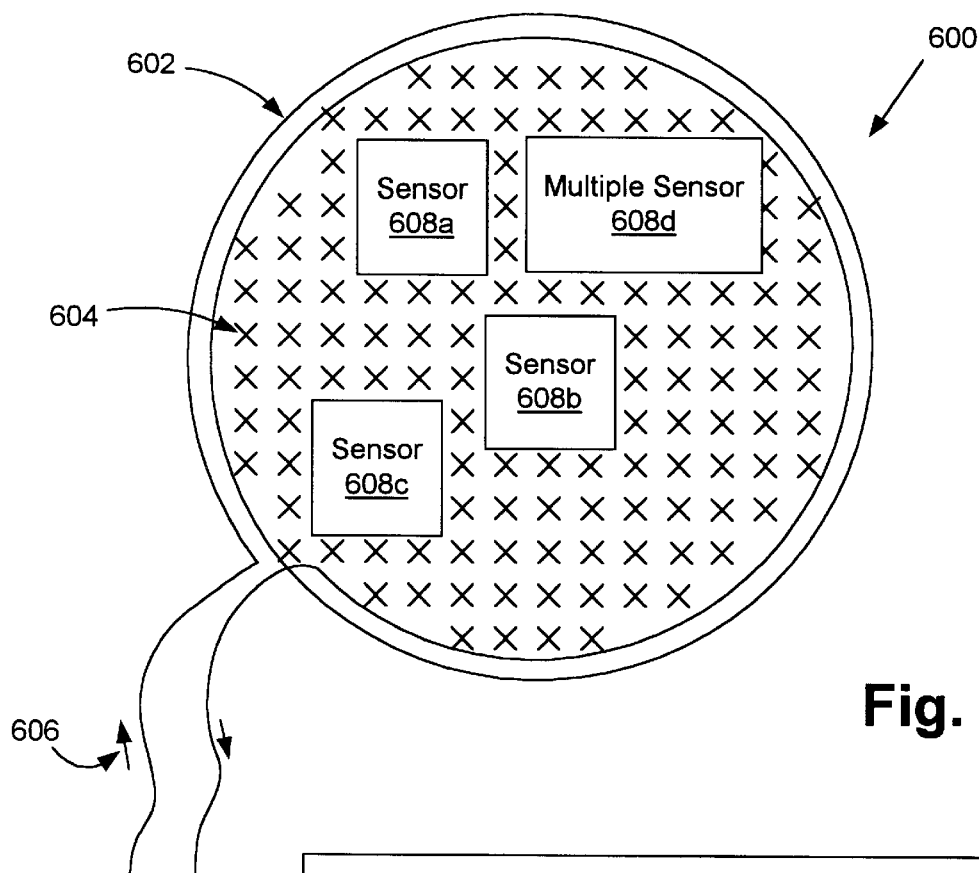
Fig. 19
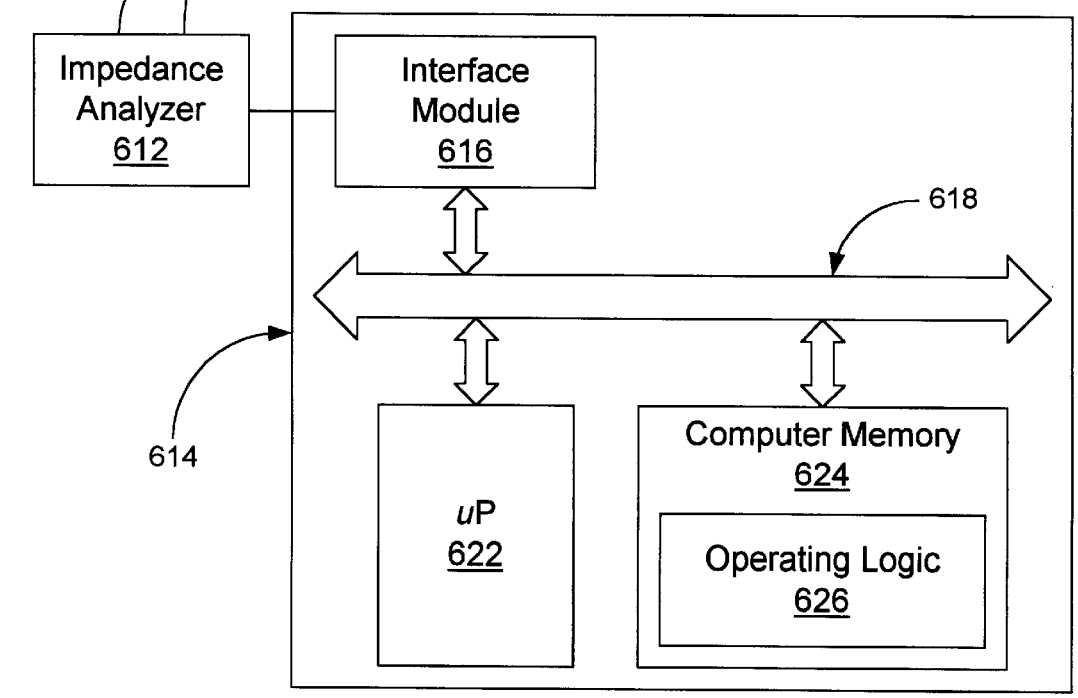

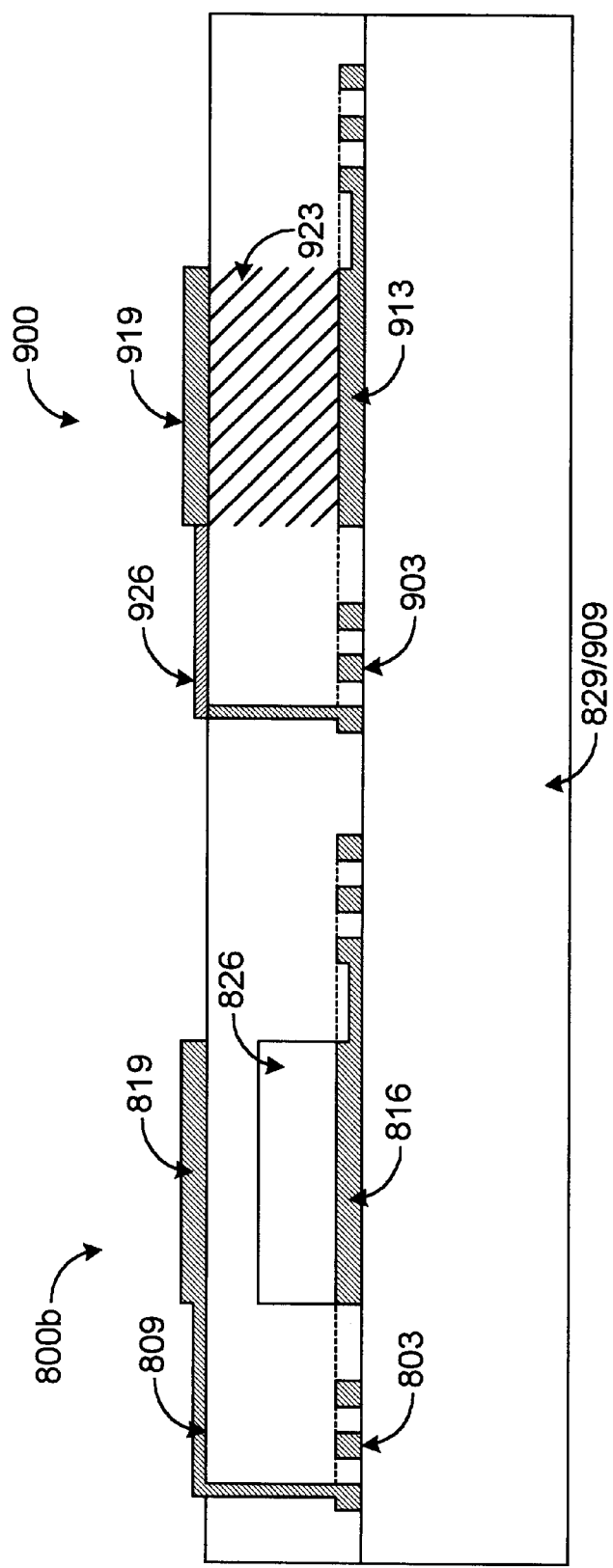

SYSTEM, METHOD, AND SENSORS FOR SENSING PHYSICAL PROPERTIES

CROSS REFERENCE TO RELATED APPLICATIONS

This application is a continuation-in-part of U.S. patent application entitled, "System, Method, and Sensors for Sensing Physical Properties," filed on Apr. 2, 1998, accorded Ser. No. 09/054,011, now U.S. Pat. No. 6,111,520, and incorporated herein by reference.

FIELD OF THE INVENTION

This invention relates to the field of physical sensors, and, more particularly, to sensors for wirelessly sensing pressure, temperature and other physical properties in a specific environment.

BACKGROUND OF THE INVENTION

Sensing technology is currently employed in a number of different environments. Specifically, sensors employed to determine the pressure or temperature of a medium are used in a wide variety of applications. Most such applications involve the use of temperature and pressure sensors in environments of low temperature or in environments of high temperature which require adequate cooling measures or the use of high temperature materials in the construction of such sensors. In such applications, for example, micro-machining techniques exist by which pressure sensors are constructed using silicon as a substrate.

An example of a micromachined silicon pressure sensor design is a capacitive pressure sensor. This sensor uses a parallel plate capacitor and a flexible silicon diaphragm. Two silicon wafers are bulk machined to create cavities in the silicon. One silicon wafer is bulk micromachined to create a deep cavity and subsequently a thin membrane. Metal layers are deposited onto appropriate boundaries of the cavities creating the conductors of the parallel plate capacitor. The wafers are bonded so that the metal conductors are facing each other and a capacitor is formed. The capacitor is electrically connected to a silicon circuit on the substrate that in turn is connected to external electronic devices via wire leads. As pressure of the medium in which the sensor is placed increases, the diaphragm deflects and the distance between the plates of the capacitor decreases, causing an increase in the capacitance. The silicon circuit reads the change in capacitance, and a resultant voltage is output via the wire leads.

Micromachined sensors such as the example given above suffer problems when exposed to certain environmental conditions. In high temperature applications, the silicon sensor and similar sensors do not operate reliably or cease to function completely due to the heat. For example, silicon begins to plastically deform at approximately 800° C. and melts at approximately 1400° C. The pressure readout due to the deflection of the flexible silicon diaphragm is compromised by the plastic deformation of silicon causing permanent measurement error. Many other sensor materials have even lower melting points that limit the operating temperature of the environment. In addition, different environments may include corrosive elements in which silicon or other similar materials may not survive.

Another problem with micromachined silicon sensors and similar sensor technology is that circuitry, electrical connections, and wire leads through which temperature, pressure, or other physical information is obtained can not withstand high temperature applications or corrosive environments. For example, silicon circuitry does not function at temperatures greater than 300° C. and high temperature solders, conductive adhesives, and wiring schemes are difficult to implement.

In addition, in the case where a temperature, pressure, or other physical reading of an environment is measured from a sensor mounted to a mobile structure such as a turbine blade or other moveable apparatus, chamber or vessel, the wire leads connected to traditional sensors may interfere with the operation of the particular mobile structure. Such would also be the case of mobile vessels in which interior pressure sensing is desired.

SUMMARY OF THE INVENTION

In accordance with a first embodiment of the present invention, there is provided a sensor for determining the pressure of a specific environment. The pressure sensor features an inductive-capacitive (LC) resonant circuit with a variable capacitor. The capacitance varies with the pressure of the environment in which the capacitor is placed. Consequently, the resonant frequency of the LC circuit of the pressure sensor varies depending on the pressure of the environment. The pressure sensor is made of completely passive components having no active circuitry or power sources such as batteries. The pressure sensor is completely self-contained having no leads to connect to an external circuit or power source.

In accordance with a second embodiment of the present invention, there is provided a sensor for determining the temperature of a specific environment. The temperature sensor features an inductive-capacitive (LC) resonant circuit with a variable capacitor. The capacitance varies with the temperature of the environment in which the capacitor is placed, the capacitor having a dielectric with a permittivity that varies with varying temperature. Consequently, the resonant frequency of the LC circuit of the pressure sensor varies depending on the temperature of the environment. The temperature sensor is made of completely passive components having no active circuitry or power sources such as batteries. Also, the temperature sensor is completely self-contained having no leads to connect to an external circuit or power source.

In accordance with a third embodiment of the present invention, there is provided a combination pressure and temperature sensor for determining both the pressure and temperature of a specific environment. The combination sensor features a first inductive-capacitive (LC) resonant circuit similar to that of the first embodiment, and a second LC circuit similar to that of the second embodiment. The temperature sensing portion of the combination sensor provides an independent source of temperature information that may be employed in real time calibration of the pressure sensor. The combination sensor is also constructed of completely passive components having no active circuitry or power sources such as batteries. Also, the combination sensor is completely self-contained having no leads to connect to an external circuit or power source.

In accordance with a fourth embodiment of the present invention, there is provided a sensor having a resistance that is variable with a specific property or physical condition of a specific environment. The variable resistance sensor features a resistive-inductive-capacitive (RLC) resonant circuit with a variable resistance. The resistance may vary with the temperature, chemical makeup of the environment including chemical species, or other physical condition of the environment to which the variable resistance is exposed. Consequently, the bandwidth of the RLC circuit of the variable resistance sensor varies depending on the value of the variable resistance which depends on a specific physical condition of the environment. The variable resistance sensor is made of completely passive components having no active circuitry or power sources such as batteries and is completely self-contained having no leads to an external circuit or power source.

In accordance with a fifth embodiment of the present invention, there is provided a variable resistance and pressure sensor that is a combination of the first and fourth embodiments. In the fifth embodiment, the inclusion of a variable resistance in the LC circuit of the first embodiment allows the determination of both the pressure from the resonant frequency of the resulting RLC circuit due to the variable capacitance, and the temperature or other physical condition from the bandwidth of the RLC circuit due to the variable resistance.

The sensors of the present invention are used in conjunction with several different excitation systems, resulting in a system and method for determining the pressure, temperature, or other physical condition. Accordingly, each of the above described sensors is electromagnetically coupled to a transmitting antenna. Consequently, a current is induced in each of the sensors that oscillates at the resonant frequency of the sensor in question. This oscillation causes a change in the frequency spectrum of the transmitted signal. From this change, the bandwidth and resonant frequency of the particular sensor may be determined, from which the corresponding physical parameters are calculated.

Accordingly, the present invention provides for an impedance system and method of determining the resonant frequency and bandwidth of a resonant circuit within a particular sensor. The system includes a transmitting antenna that is coupled to an impedance analyzer. The impedance analyzer applies a constant amplitude voltage signal to the transmitting antenna scanning the frequency across a predetermined spectrum. The current passing through the transmitting antenna experiences a peak at the resonant frequency of the sensor. The resonant frequency and bandwidth are thus determined from this peak in the current.

The method of determining the resonant frequency and bandwidth using an impedance approach may include the steps of transmitting an excitation signal using a transmitting antenna and electromagnetically coupling a sensor having a resonant circuit to the transmitting antenna thereby modifying the impedance of the transmitting antenna. Next, the step of measuring the change in impedance of the transmitting antenna is performed, and finally, the resonant frequency and bandwidth of the sensor circuit are determined.

In addition, the present invention provides for a transmit and receive system and method for determining the resonant frequency and bandwidth of a resonant circuit within a particular sensor. According to this method, an excitation signal of white noise or predetermined multiple frequencies is transmitted from a transmitting antenna, the sensor being electromagnetically coupled to the transmitting antenna. A current is induced in the resonant circuit of the sensor as it absorbs energy from the transmitted excitation signal, the current oscillating at the resonant frequency of the resonant circuit. A receiving antenna, also electromagnetically coupled to the transmitting antenna, receives the excitation signal minus the energy that was absorbed by the sensor. Thus, the power of the received signal experiences a dip or notch at the resonant frequency of the sensor. The resonant frequency and bandwidth are determined from this notch in the power.

The transmit and receive method of determining the resonant frequency and bandwidth of a sensor circuit includes the steps of transmitting a multiple frequency signal from transmitting antenna, and, electromagnetically coupling a resonant circuit on a sensor to the transmitting antenna thereby inducing a current in the sensor circuit. Next, the step of receiving a modified transmitted signal due to the induction of current in the sensor circuit is performed. Finally, the step of determining the resonant frequency and bandwidth from the received signal is executed.

Yet another system and method for determining the resonant frequency and bandwidth of a resonant circuit within a particular sensor includes a chirp interrogation system. This system provides for a transmitting antenna that is electromagnetically coupled to the resonant circuit of the sensor. An excitation signal of white noise or predetermined multiple frequencies is applied to the transmitting antenna for a predetermined period of time, thereby inducing a current in the resonant circuit of the sensor at the resonant frequency. The system then listens for a return signal that radiates from the sensor. The resonant frequency and bandwidth of the resonant circuit are determined from the return signal.

The chirp interrogation method for determining the resonant frequency and bandwidth of a resonant circuit within a particular sensor includes the steps of transmitting a multifrequency signal pulse from a transmitting antenna, electromagnetically coupling a resonant circuit on a sensor to the transmitting antenna thereby inducing a current in the sensor circuit, listening for and receiving a return signal radiated from the sensor circuit, and determining the resonant frequency and bandwidth from the return signal.

Finally, the present invention provides an analog system and method for determining the resonant frequency of a resonant circuit within a particular sensor. The analog system comprises a transmitting antenna coupled as part of a tank circuit that in turn is coupled to an oscillator. A signal is generated which oscillates at a frequency determined by the electrical characteristics of the tank circuit. The frequency of this signal is further modified by the electromagnetic coupling of the resonant circuit of a sensor. This signal is applied to a frequency discriminator that in turn provides a signal from which the resonant frequency of the sensor circuit is determined.

The analog method for determining the resonant frequency and bandwidth of a resonant circuit within a particular sensor includes the steps of generating a transmission signal using a tank circuit which includes a transmitting antenna, modifying the frequency of the transmission signal by electromagnetically coupling the resonant circuit of a sensor to the transmitting antenna, and converting the modified transmission signal into a standard signal for further application.

In another embodiment, the present invention provides for a pressure sensor, comprising a resonant circuit having a capacitor and an inductor. The pressure sensor further includes a substrate with a structural layer placed over the substrate, the structural layer defining a cavity with a diaphragm having an external surface and an internal surface, the diaphragm being moveable in response to a pressure applied to the external surface. Also, the capacitor is comprised of at least a first plate positioned on the diaphragm and a second plate positioned opposite the first plate with the cavity therebetween, wherein a capacitance of the capacitor is variable with a movement of the diaphragm. Finally, the inductor includes a first end coupled to the first plate and a second end coupled to the second plate, the inductor inducing a current in the resonant circuit when exposed to a time-varying electromagnetic field.

In another embodiment, a temperature sensor is provided, comprising a resonant circuit having a capacitor and an inductor. The temperature sensor also includes a substrate, a first plate located on the substrate, and a structural layer placed over the substrate, the structural layer covering the first plate and the structural layer having a permittivity that changes with temperature. The temperature sensor also includes a second plate placed over the structural layer opposite the first plate, the first and second plates forming the capacitor and the inductor having a first end coupled to the first plate and a second end coupled to the second plate, the inductor inducing a current in the resonant circuit when exposed to a time-varying electromagnetic field.

In still another embodiment, a temperature sensor is provided, comprising a resonant circuit having a capacitor, an inductor, and a resistor. The temperature sensor also comprises a substrate, a first plate located on the substrate, and a structural layer placed over the substrate, the structural layer covering the first plate, and the structural layer having a permittivity that changes with temperature. The temperature sensor further includes a second plate placed over the structural layer and adjacent to the first plate, the first and second plates forming the capacitor. Finally, the temperature sensor comprises the resistor being variable in response to a change in temperature, and the inductor inducing a current in the resonant circuit when exposed to a time-varying electromagnetic field.

The present invention also includes an embodiment directed to a sensor to detect a presence of a chemical species in a medium, comprising a resonant circuit having a capacitor, an inductor, and a resistor. The chemical species sensor also includes a substrate, a first plate located on the substrate, a structural layer placed over the substrate, the structural layer covering the first plate, the structural layer having a permittivity that changes with temperature, and a second plate placed over the structural layer and adjacent to the first plate, the first and second plates forming the capacitor. The chemical species sensor also includes the resistor being variable in response to a presence of a chemical species, and the inductor inducing a current in the resonant circuit when exposed to a time-varying electromagnetic field.

In another embodiment, the present invention provides for an acceleration sensor, comprising a resonant circuit having a capacitor and an inductor. The acceleration sensor also includes a substrate, a structural layer placed over the substrate, the structural layer defining a cavity with a diaphragm having an external surface and an internal surface, the diaphragm being moveable in response to an acceleration experienced by the acceleration sensor. The capacitor of the acceleration sensor at least a first plate positioned on the diaphragm and a second plate positioned opposite the first plate with the cavity therebetween, wherein a capacitance of the capacitor is variable with a movement of the diaphragm, and the inductor having a first end coupled to the first plate and a second end coupled to the second plate, the inductor inducing a current in the resonant circuit when exposed to a time-varying electromagnetic field.

Finally, in another embodiment, a second acceleration sensor is provided, comprising a resonant circuit having a capacitor and an inductor. The second acceleration sensor includes a first layer having a first plate, at least one middle layer having a hole, and a second layer having a second plate, wherein the first layer, middle layer, and the second layer are stacked, the first plate being located opposite the second plate with the hole therebetween. The first and second plates of the second acceleration sensor define the capacitor, the first plate defining a diaphragm that is moveable in response to an acceleration experienced by the acceleration sensor, the first capacitor having a capacitance that varies with a movement of the diaphragm, the inductor inducing a current in the resonant circuit when exposed to a time-varying electromagnetic field.

According to the present invention, multiple sensors may be employed at a single time to provide redundancy and more accurate information, or to measure several physical conditions simultaneously. Also, the spatial resolution of physical characteristics may be obtained. Such multiple sensors may either be discretely placed in the system to be sensed, or may all be formed on or in a single substrate according to batch fabrication techniques and placed in the system or environment to be sensed.

The above mentioned sensors may be advantageously manufactured using a bulk machining approach, a surface machining approach, or a combination of bulk machining and surface machining.

Other features and advantages of the present invention will become apparent to one with skill in the art upon examination of the following drawings and detailed description. It is intended that all such additional features and advantages be included herein within the scope of the present invention, as defined by the claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention. In the drawings, like reference numerals designate corresponding parts throughout the several views.

FIG. 19 is a block diagram of the excitation system of FIG. 10 with multiple sensors;

FIG. 26 is a side view of a combination pressure and temperature sensor produced using surface machining techniques;

DETAILED DESCRIPTION OF THE PREFERRED EMBODIMENT

LC Pressure Sensor

Figure 1:
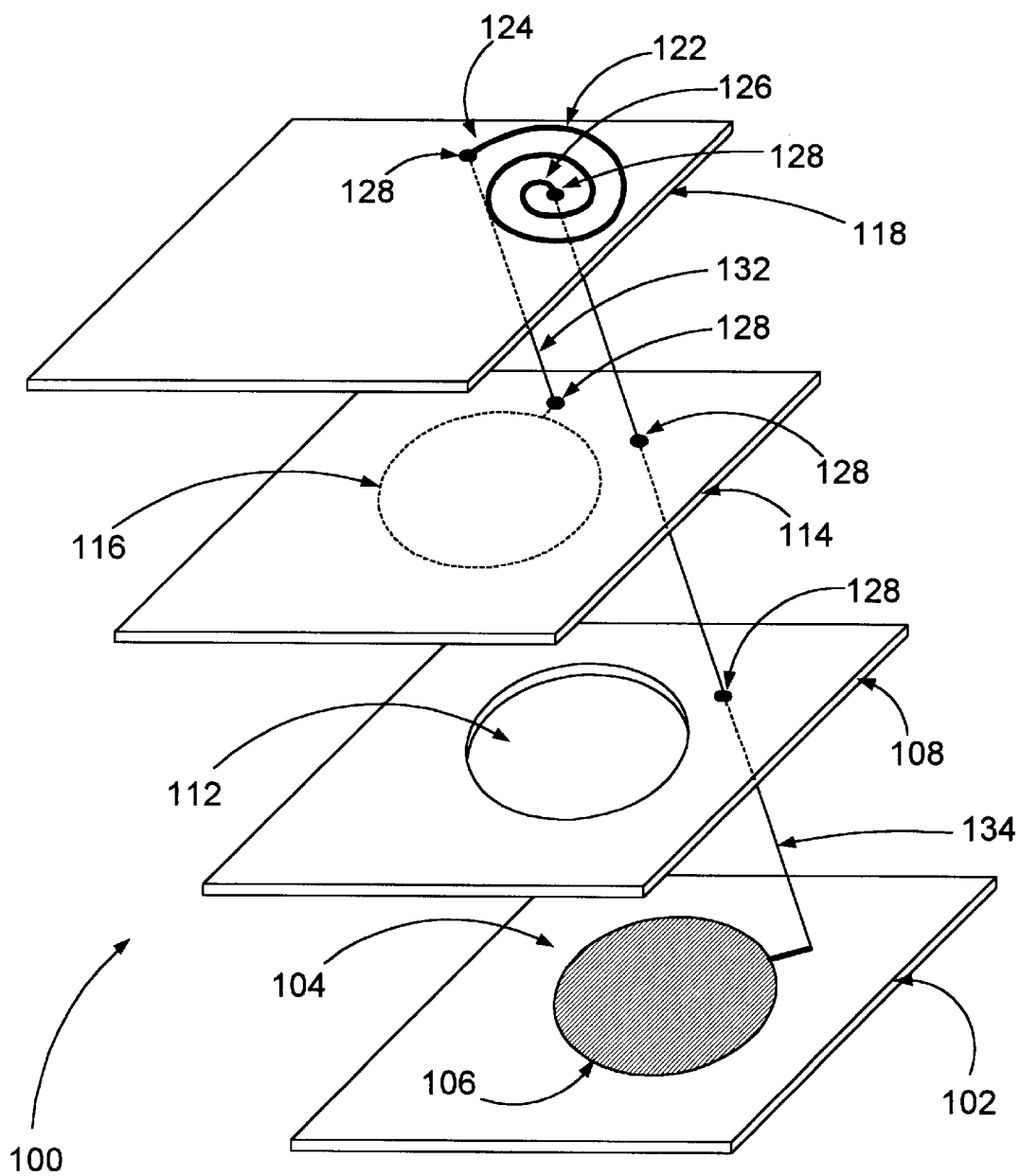
FIG. 1 is an assembly view of a pressure sensor according to a first embodiment of the present invention.

Turning to FIG. 1, shown is an assembly view of a pressure sensor 100 according to a first embodiment of the present invention. The pressure sensor 100 is constructed using a first layer 102 with a central portion that acts as a flexible membrane 104. The central portion that acts as the flexible membrane 104 is essentially the first layer 102 itself unchanged, and not a distinct surface area in the preferred embodiment, but it is not restricted to this structure. A metal pattern which defines a bottom conductor 106 is disposed on the top of the first layer 102 lying over the flexible membrane 104 using any suitable micromachining technique(s). A second layer 108 overlies the first layer 102. A hole 112 is formed through the second layer 108 that mates with the bottom conductor 106. Although a single second layer 108 is shown, several second layers may be placed in alignment with each other in the place of the single second layer 108. A third layer 114 overlies the second layer 108. Disposed on the underside of the third layer 114 is a metal pattern that defines a second conductor 116. The first and second conductors 106 and 116 are generally the same size and shape as the hole 112 in the second layer 108.

Finally, a fourth layer 118 overlies the third layer 114. Disposed on top of the fourth layer 118 is an inductor coil 122 with an outer end 124 and an inner end 126. In order to provide for an electrical contact between the outer end 124 and the second conductor 116, and the inner end 126 and the bottom conductor 106, small vias 128 are cut through the second, third, and fourth layers 102, 108, 114, 118 where appropriate. The small vias 128 are punched in the layers concurrently with the holes 112. When assembled, the first, second, third, and fourth layers 102, 108, 114, 118 are aligned as shown and a metal paste is forced into the small vias 128 to create the first and second electrical connections 132 and 134. In the preferred embodiment, the first, second, third, and fourth layers 102, 108, 114, 118 are formed from ceramic tape, which is commonly used in microelectronics packaging and which is generally created from alumina and glass particles suspended in an organic binder. After alignment and via filling, the layers 102, 108, 114, 118 are laminated together in a hot vacuum press at 70° C. and a pressure of about 3000 psi with a vacuum level of 28Δ of Hg. The laminated structure is cured in a furnace at about 850° C. for one hour.

Although the material used to create the layers 102, 108, 114, 118 is ceramic tape in the preferred embodiment, many other materials may just as easily be used including silicon (Si), silicon carbide (SiC), ceramic pastes, alumina substrates, ceramic inks, polycrystalline diamond films, electroplated metals, quartz ($SiO_2$), and polymer thin films as well as other materials known by those skilled in the art. Such other materials may include organic technologies such as metallized, patterned, or unmetallized polymer films suitable for lamination, casting, or other deposition techniques, glass or other inorganic cloth impregnated with epoxy or other organic materials, or other materials. For example, these materials include those discussed in Tummala et al., "Microelectronics Packaging Handbook, Semiconductor Packaging, Part II," Chapman & Hall, New York, 1997, which is incorporated herein by reference in its entirety. The actual materials employed may be chosen based upon their respective properties for the particular environment in which the sensors resulting therefrom are placed. For example, for high temperature or corrosive environments, ceramic materials may be preferred. For less aggressive environments or relatively low temperature, silicon or organic technologies may be desirable. Medical applications, for example, may require the use of biocompatible materials. Another factor that bears on the question of the precise material used is material cost and relative production costs. For example, generally many of the organic materials can be processed at lower cost than the ceramic materials.

Likewise, materials that may be used to construct the inductor coil 122, first and second conductors 106 and 116, and electrical connections 132 and 134 include gold (Au), copper (Cu), aluminum (Al), tungsten (W), silver (Ag), palladium (Pd), platinum (Pt), chromium (Cr), molybdenum (Mo), and most possible alloys of these metals as well as other materials known by those skilled in the art. The actual materials chosen to construct the sensor ultimately depends on the particular application for the sensor in question. Additionally, although lamination is used in the preferred embodiment, other surface and bulk micromachining techniques known in the art can be employed to form these structures. Also note, the materials as discussed above may be employed for all embodiments discussed herein, including bulk machining techniques and surface machining techniques, etc. Generally, the term "machining" as employed herein refers to micromachining techniques as well as other techniques by which one may generate equivalent sensor structures to those described herein.

Figure 2:
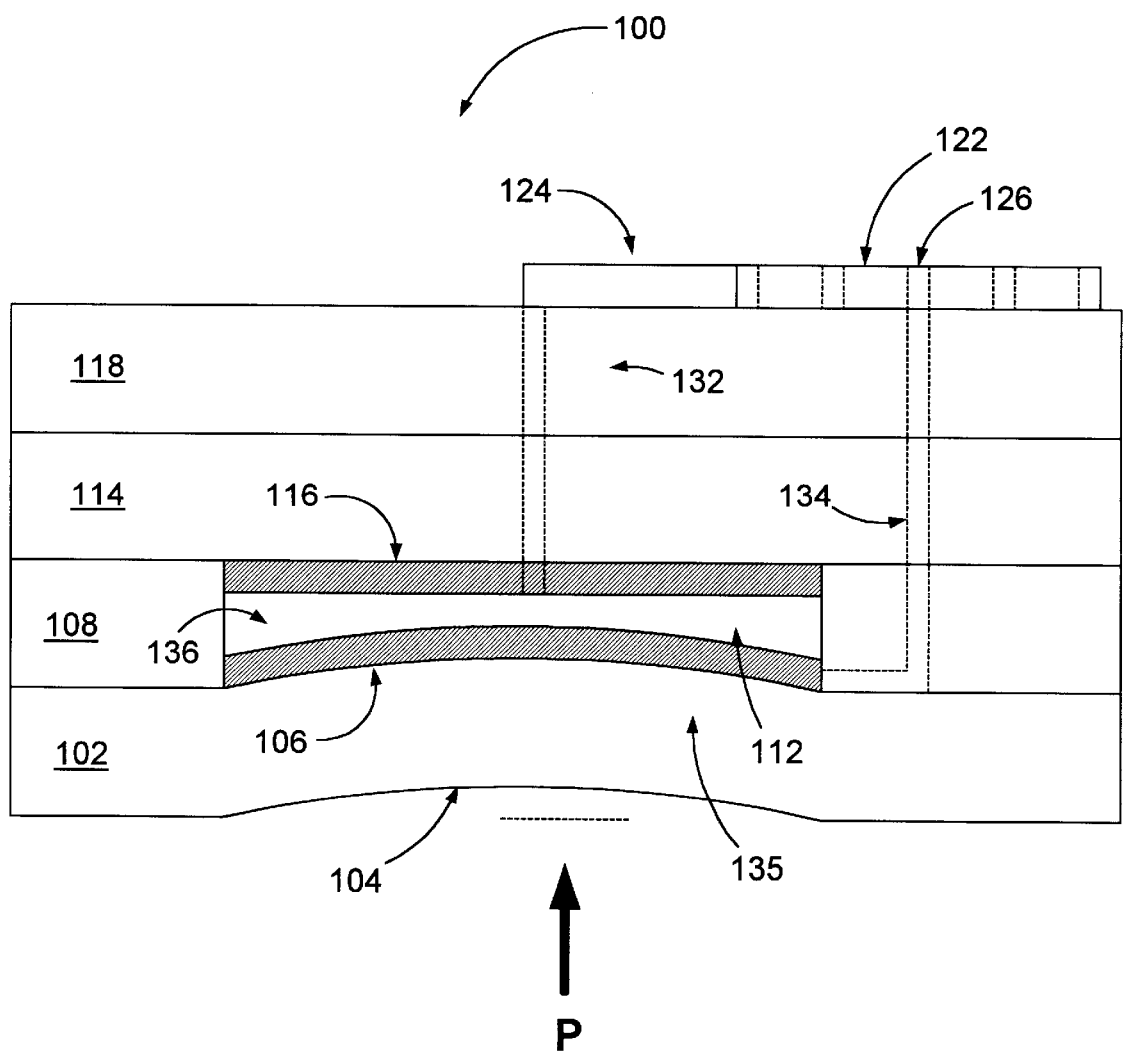
FIG. 2 is a cross-sectional view of the pressure sensor of FIG. 1.

Referring next to FIG. 2, shown is a cross-sectional view of the pressure sensor 100 after curing. Once fully formed, the first and second conductors 106 and 116 together form a capacitor 135. The force of the pressure P deflects the flexible membrane 104 as shown. It is understood herein that the pressure P is actually force distributed over an area as is known in the art, however, one or more discrete forces may also be exerted against the diaphragm as well. Note that the degree of flexibility in the flexible membrane 104 may be altered by adding additional layers onto the end layer 102 to add rigidity. The gap 136 between the first and second conductors 106 and 116 is variable across the surface area due to the curved nature of the deflection of the flexible membrane 104. Consequently, the capacitance C of the capacitor 135 can only be approximated by, $$C = \frac{\varepsilon_0 \varepsilon_r A}{d},$$

where $\epsilon_0$ is the permittivity of free space, $\epsilon_r$ is the relative permittivity of the material between the conductors 106 and 116, and A is the surface area of the first and second conductors 106 and 116, because the above formula is used to calculate the capacitance C of two parallel plates with constant surface area and uniform distanced. It is possible to calculate the capacitance C in the case of a spherical or bubbled flexible membrane as known in the art, or the sensor may simply be calibrated.

The pressure load causes the flexible membrane 104 to deflect, the first and second conductors 106 and 116 move closer together and the gap 136 decreases. As the gap 136 decreases, the capacitance C increases as is known by those skilled in the art. Thus the capacitance C of the pressure sensor 100 is variable with the pressure P of the environment in which the pressure sensor 100 is placed.

The first conductor 106 is electrically connected to the inner end 126 of the inductor coil 122 and the second conductor 116 is electrically connected to the outer end 124 of the inductor coil 122 through the electrical connectors 132 and 134. Thus, neglecting parasitic resistances of the conductor lines, a resonant inductive-capacitive (LC) circuit is formed. The resonant frequency $\omega_0$ of the resonant circuit is found in the formula $$\omega_0 = \frac{1}{\sqrt{L \cdot C(P)}}$$

where L is the inductance of the inductor coil 122 and C(P) is the capacitance of the capacitor formed by the first and second conductors 106 and 116 which varies with pressure P. As the pressure P increases and the flexible membrane 104 deflects, the distance d decreases causing the capacitance C to increase, and consequently, the resonant frequency decreases. Thus, the resonant frequency of the pressure sensor 100 changes with a corresponding change in pressure P.

It should be noted that certain non-ideal conditions exist with regard to the resonant frequency of the resonant circuits discussed herein. Specifically, the resonant frequency may depend in part on a quality factor Q of a particular resonant circuit when the quality factor Q is very small. Such non-ideal conditions should be taken into account in obtaining measurements of the resonant frequency as discussed herein.

The pressure sensor 100 is designed to allow a current to be induced in the inductor coil 122 when the pressure sensor 100 is placed in a time varying electromagnetic field generated from an external excitation signal. Thus, when placed in a time-varying electromagnetic field, the inductor coil 122 is electromagnetically coupled to the source of the electromagnetic field, presumably, but not limited to, a transmitting antenna. If the electromagnetic field is comprised at least in part of frequencies at or near the resonant frequency of the pressure sensor 100, then a current is induced in the inductor coil 122 which oscillates at the resonant frequency of the resonant circuit. In this manner, the resonant circuit is "excited" by a transmitted signal. There are several ways to excite the current in the resonant circuit. By doing so, the impedance of the transmitting antenna is altered. This condition may be detected, and ultimately, the resonant frequency of the pressure sensor may be ascertained and the pressure calculated as will be discussed later.

It is a distinct advantage that the pressure sensor 100 is comprised of completely passive components. There are no wire leads or power sources such as batteries employed as the sensor is designed to be electromagnetically coupled to a transmitter. In addition, no active components such as transistors, amplifiers, or other active components are employed herein. Also, the preferred embodiment above has the additional advantage that it is constructed using existing materials and manufacturing infrastructure. Specifically, sensors may be manufactured using batch fabrication techniques and other micromachining techniques that are known to those skilled in the art.

Figure 3:
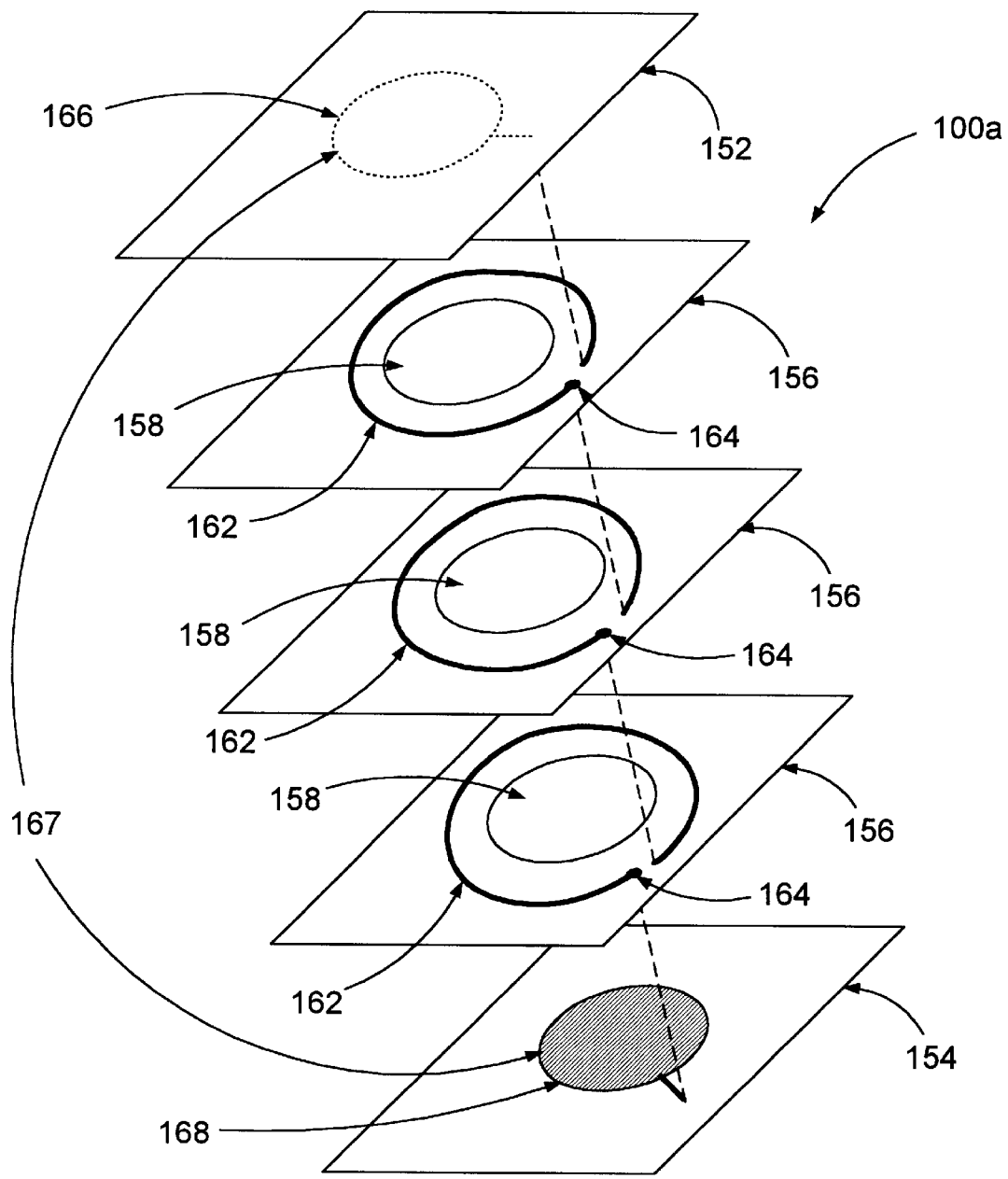
FIG. 3 is an assembly view of an alternative pressure sensor according to the first embodiment of the present invention.

Turning to FIG. 3, shown is an assembly view of an alternative pressure sensor 100a according to the first embodiment of the present invention. In fact, it is possible that there are many different configurations by which a pressure sensor 100 may be constructed using existing micromachining techniques. The alternative pressure sensor 100a serves as a further example. The pressure sensor 100a features a first layer 152 and a second end layer 154. Disposed between the first and second end layers 152 and 154 are inner layers 156. In the middle of each inner layer 156 is a large hole 158. Also, a single winding 162 constructed from a conductor material is patterned on the inner layers 156 around the large hole 158. At the end of each winding 162, a small via 164 is cut through each inner layer 156.

The first end layer 152 is patterned with metal to create a first conductor 166 of a parallel plate capacitor 167. The second end layer 154 is patterned with a second conductor 168 of the capacitor 167. Note the second end layer 154 may actually comprise several layers together to add rigidity if desired. The first and second conductors 166 and 168 are slightly smaller in diameter than the large holes 158 in the inner layers 156. Upon final construction of the pressure sensor 100a, the first end layer 152, inner layers 156, and the second end layer 154 are aligned together. The windings 162 mate with each other and with the first and second conductors 166 and 168 through the small vias 164 by the injection of a metallic paste in similar manner as the pressure sensor 100 (FIG. 1). As was the case with the pressure sensor 100, the aligned first and second end layers 152 and 154, and the inner layers 156 are laminated in a hot vacuum press and cured in a furnace. Together the windings 162 form an inductor coil which functions in the same manner as the inductor coil 122 (FIG. 1) of the pressure sensor 100.

It is additionally noted that additional layers may be placed over any exposed conductive material if a pressure sensor 100 is sought with no exposed conductors. For that matter, a window may be punched through such additional layers to expose a desired conductor.

Figure 4:
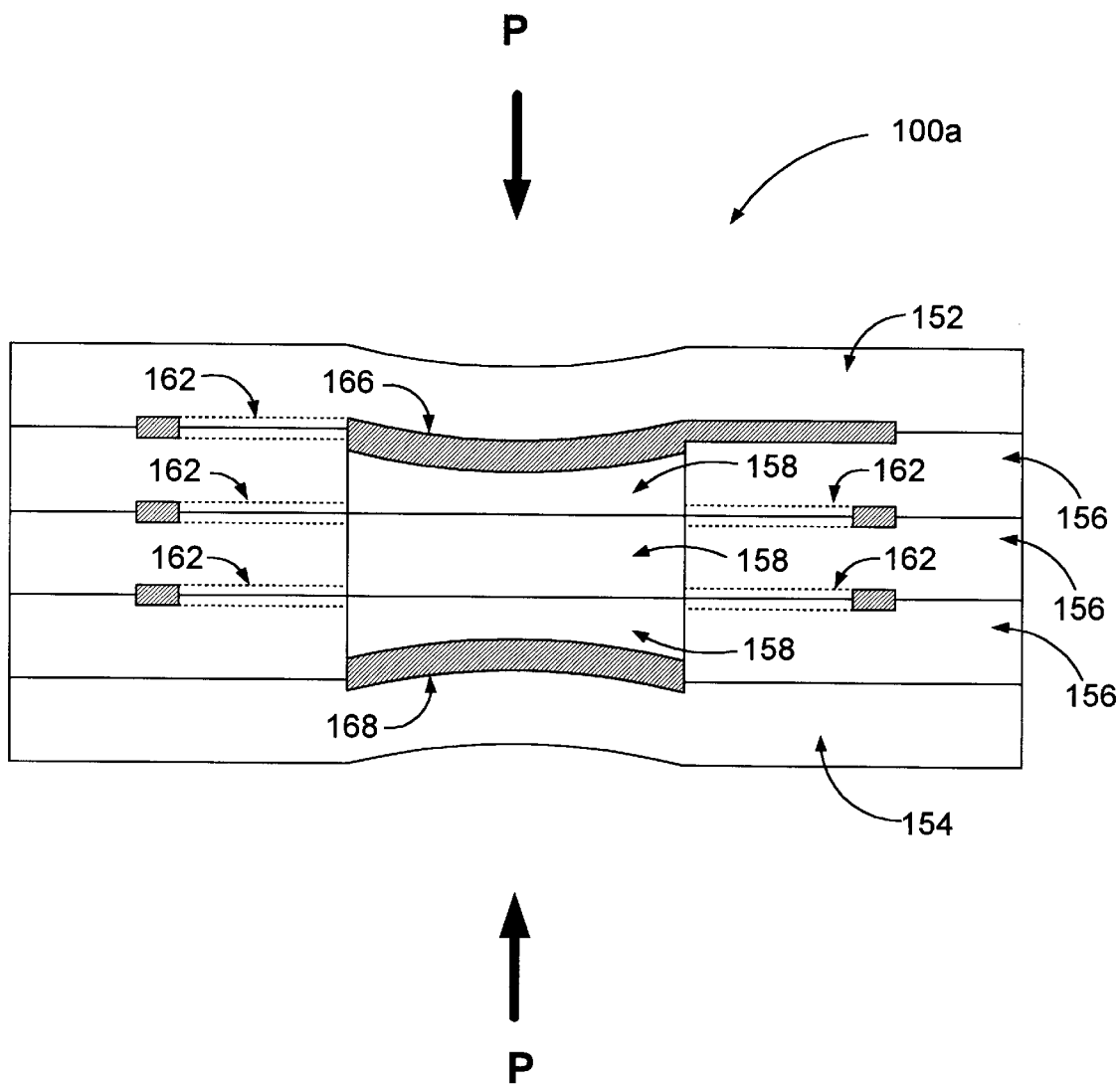
FIG. 4 is a cross-sectional view of the pressure sensor of FIG. 3.

Turning then to FIG. 4, shown is a sectional view of the pressure sensor 100a fully assembled. Similar to the pressure sensor 100 (FIG. 2), the pressure P causes the deflection of the first and second end layers 152 and 154. Note that the extent of this deflection may be controlled by creating the first and second end layers 152 and 154 using thicker layer material, or alternatively, several end layers together with the first and second conductors 166 and 168 disposed on the inner most layer. The operation of the pressure sensor 100a is similar to that of the pressure sensor 100 and is not discussed in detail herein. Also, the small vias 164 (FIG. 3) cut through the inner layers 156 are not shown, Additionally, the pressure sensor 100a is preferably constructed from ceramic tape as was the case with the pressure sensor 100, however, all the materials that may be used in the construction of the pressure sensor 100 may be used to construct the pressure sensor 100a.

LC Temperature Sensor

Figure 5:
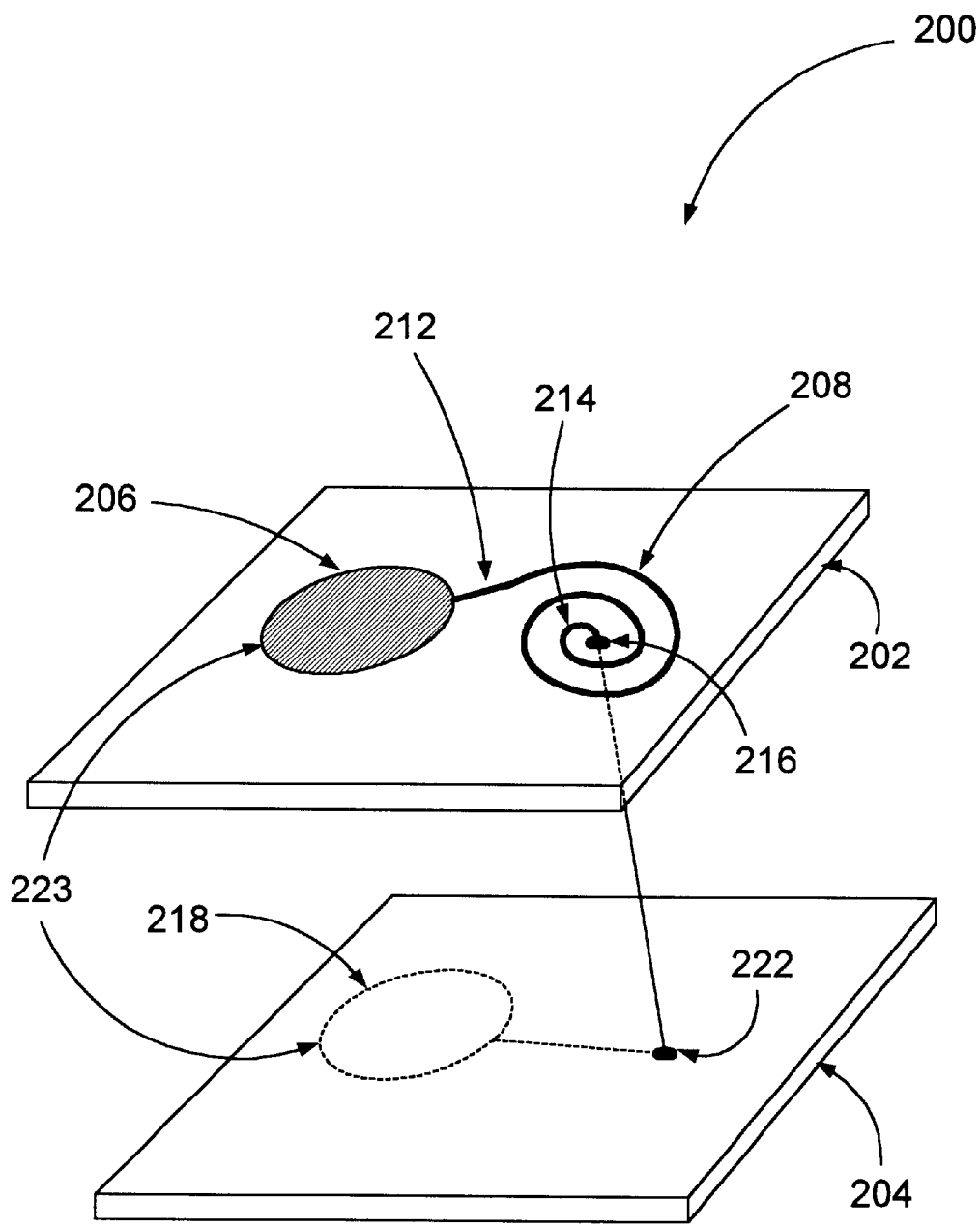
FIG. 5 is an assembly view of a temperature sensor according to a second embodiment of the present invention.

Turning next to FIG. 5, shown is an assembly view of a temperature sensor 200 according to a second embodiment of the present invention. The temperature sensor 200 features a first layer 202 and a second layer 204. Disposed, for example, by means of a printing process on the first layer 202 is a first conductor 206 of a parallel plate capacitor and an inductor coil 208. The inductor coil 208 has an outer end 212, which is attached to the first conductor 206. An inner end 214 of the inductor coil 208 terminates at a first small via 216 cut through the first layer 202.

Disposed on the second layer 204 is a second conductor 218 of the parallel plate capacitor. A small via 222 is cut through the second layer 204 that aligns with the first small via when the first layer 202 is aligned with the second layer 204. The outer end 212 of the inductor coil 208 is electrically connected to the second conductor 218 by injecting a metal paste into the first and second vias 216 and 222 when the temperature sensor 200 is assembled. The assembled temperature sensor 200 is laminated in a hot vacuum press and cured in a furnace.

In the case of the temperature sensor 200, the first and second layers 202 and 204 act as a dielectric in a capacitor 223 formed by the first and second conductors 206 and 218. As was the case with the pressure sensor 100 (FIG. 1), the inductor coil 208 coupled to the capacitor 223 defines an LC resonant circuit. A current is excited in this resonant circuit in the same manner as the resonant circuit of the pressure sensor 100. However, the permittivity of the dielectric which comprises the first and second layers 202 and 204 changes with temperature. Thus, the capacitance C of the capacitor 223 varies with a change in temperature as defined by $$C = \frac{\varepsilon(T)A}{d}$$

where $\epsilon(T)$ is the permittivity of the dielectric as a function of temperature, A is the area of the first and second conductors 206 and 218, and d is the distance between the first and second conductors 206 and 218. Note, however, that the area A and the distance d will also slightly change due to thermal expansion effects resulting in a change in capacitance C. These changes in capacitance C, along with the permittivity induced capacitive changes are all taken into account during calibration of the sensor. Thus, the resonant frequency of the resonant circuit of the temperature sensor 200 depends on the temperature of the environment in which the temperature sensor 200 is placed. Suitable calibration of the temperature sensor 200 will provide the resonant frequency as a function of temperature.

Figure 6:
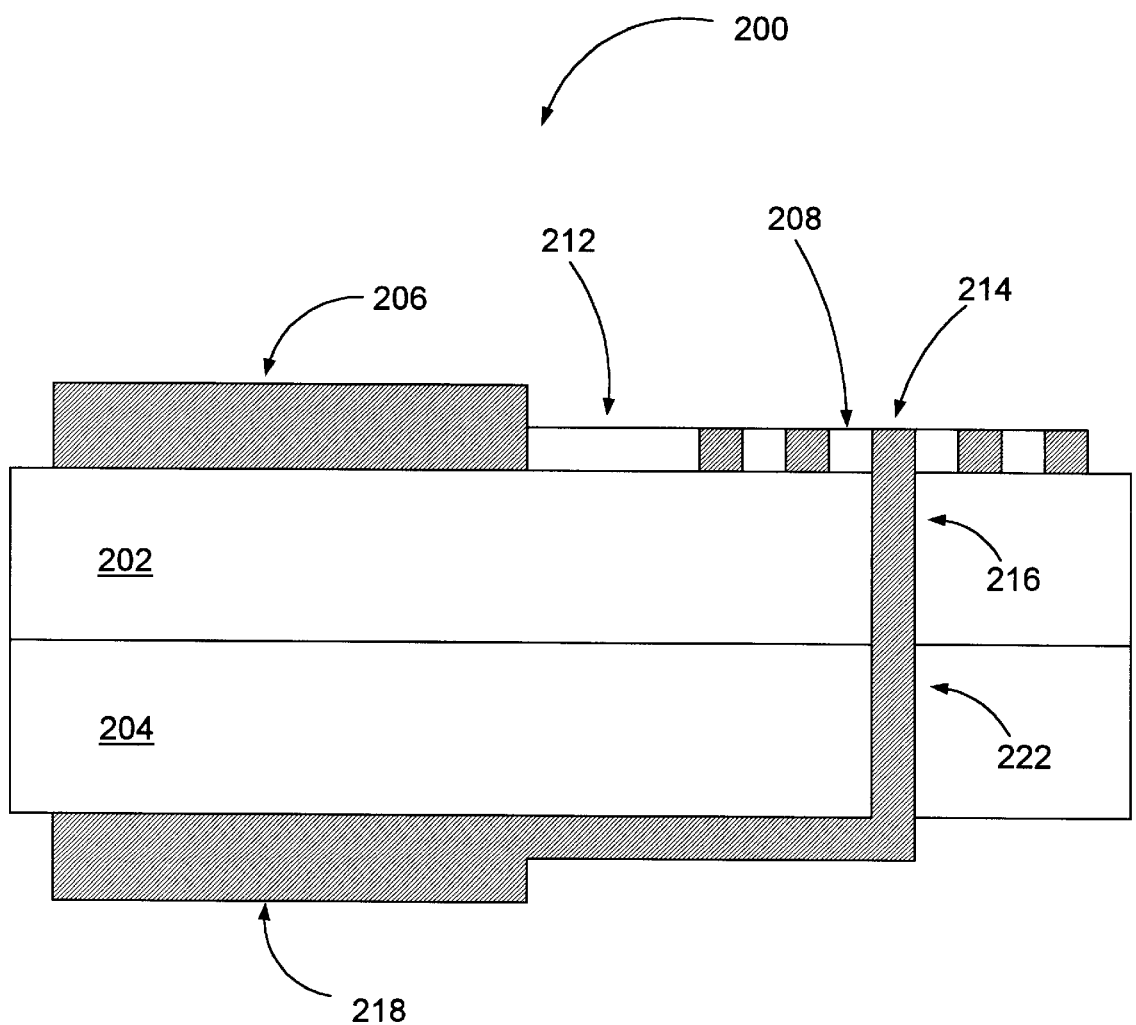
FIG. 6 is a cross-sectional view of the pressure sensor of FIG. 5.

It should be noted that certain non-ideal conditions exist with regard to temperature sensor 100 that may effect performance such as the change in the physical sizes of the area A and the distance D due to thermal expansion when heat is applied. In addition, the LC circuits all have a parasitic resistance that keeps the Q factor less than infinite. FIG. 6 shows a sectional view of the temperature sensor 200 fully assembled.

Combination LC Pressure and Temperature Sensor

Figure 7:
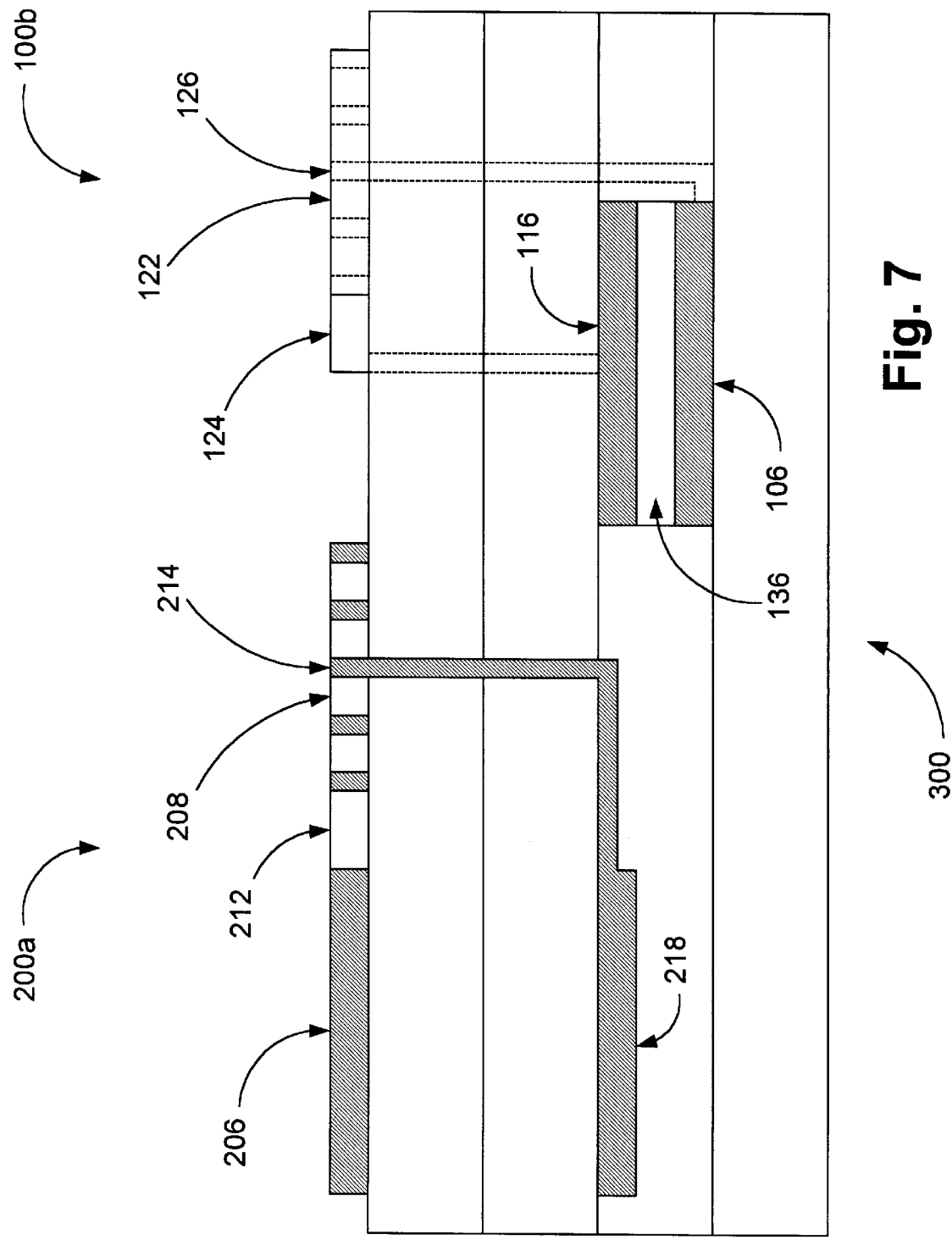
FIG. 7 is a cross-sectional view of a dual pressure and temperature sensor according to a third embodiment of the present invention.

Turning to FIG. 7, shown is a cross-section of a combination pressure and temperature sensor 300 according to a third embodiment of the present invention. In the third embodiment, the pressure sensor 100 (FIG. 1) and the temperature sensor 200 (FIG. 5) are combined into the combination sensor 300. The combination sensor 300 features a pressure sensor 100b with a first conductor 106, an inductor coil 122, and a second conductor 116. A gap 136 is disposed between the first and second conductors 106 and 116. The inductor coil 122 includes an outer end 124 and an inner end 126. The structure of the pressure sensor 100b is similar to that of the pressure sensor 100 (FIG. 1) and is not discussed in further detail.

On the other end of the combination sensor 300 is a temperature sensor 200a with a first conductor 206, an inductor coil 208, and a second conductor 218. The inductor coil 208 includes an outer end 212 and an inner end 214. The structure of the temperature sensor 200a is similar to that of the temperature sensor 200 (FIG. 5) and is not discussed in further detail.

The combination sensor 300 is particularly useful when attempting to deconvolve any parasitic temperature effects in the pressure sensor 100b by providing an independent measure of temperature with the temperature sensor 200a. This temperature measurement can be used for external calibration of the pressure sensor 100b. For example, if the dependence of the pressure sensor 100b on both pressure and temperature is known (e.g., after a suitable calibration of the pressure sensor 100b, and the temperature of the pressure sensor 100b is independently measured, the operating temperature of the pressure sensor 100b is known and therefore from the original calibration of the pressure sensor 100b, an accurate temperature-calibrated pressure reading can be calculated.

This calculation may be performed on some accompanying external processor based computer or other circuit that operates on the temperature and pressure readings taken from the sensors 100b and 200a. It should be noted that an important advantage of this approach is that the sensor calibration all takes place externally, so no correcting circuitry need be incorporated directly on the sensor substrate and therefore potentially exposed to high temperature or require an internal power supply.

The independent measurement of the temperature is best accomplished by the temperature sensor 200a formed on the combination sensor 300 with the pressure sensor 100b so as to ensure good thermal contact between the sensors 100b and 200a to make sure the temperature reading of the temperature sensor 200a is in fact the temperature of the pressure sensor 100b. Also, care should be taken to ensure that the resonant frequencies of the sensors 100b and 200a are sufficiently different so as to prevent any interference between the two. That is to say that the range of frequencies over which each sensor 100b and 200a operates should not overlap with each other. This is accomplished by choosing appropriate values for the capacitance and inductance of each sensor 100b and 200a that result in the desired operating range of frequencies of the sensors 1Ob and 200a.

Also, the principles of construction including the micromachining methods as well as the materials discussed for the first and second embodiments apply to the third embodiment.

LCR Variable Resistance Sensor

Figure 8A:
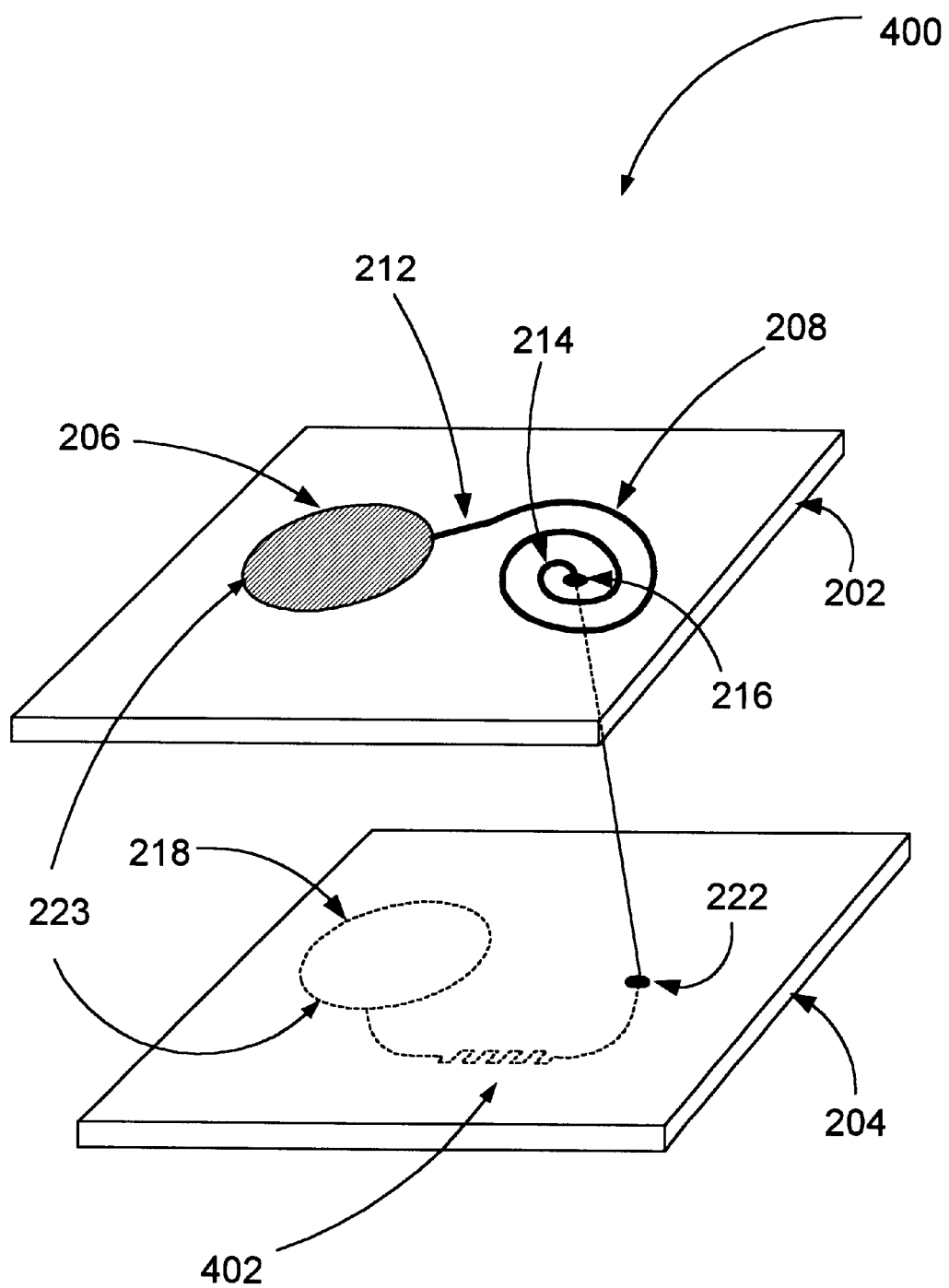
FIG. 8A is an assembly view of a temperature sensor according to a fourth embodiment of the present invention.

Turning next to FIG. 8A, shown is an assembly view of a variable resistance sensor 400 according to a fourth embodiment of the present invention. The variable resistance sensor 400 is similar to the temperature sensor 200 (FIG. 5) with the addition of a variable resistance 402 in series with the capacitor formed by the first and second conductors 206 and 218 and the coil inductor 208 as shown. This variable resistance 402 might also be incorporated into part of the inductor coil 208, or for that matter, the inductor coil 208 may be constructed by winding the variable resistance 402 in a coil form.

The addition of the variable resistance 402 affects the bandwidth of the resistive- inductive-capacitive (RLC) circuit as known in the art. Note that all previous sensors discussed herein did not actually have a resistor placed in the LC circuit, however, a minimum resistance is inherent in the conductors used as is known in the art. The bandwidth varies with the variable resistance, the relationship being defined by $$\beta = \frac{R}{L},$$

where $\beta$ is the bandwidth of the RLC circuit, L is the inductance, and R is the resistance. Thus, once the inductance L of the variable resistance sensor 400 is known and the bandwidth of the circuit determined, the variable resistance 402 can be calculated, revealing the temperature or other parameter which is tied to the value of the variable resistance 402.

Figure 8B:
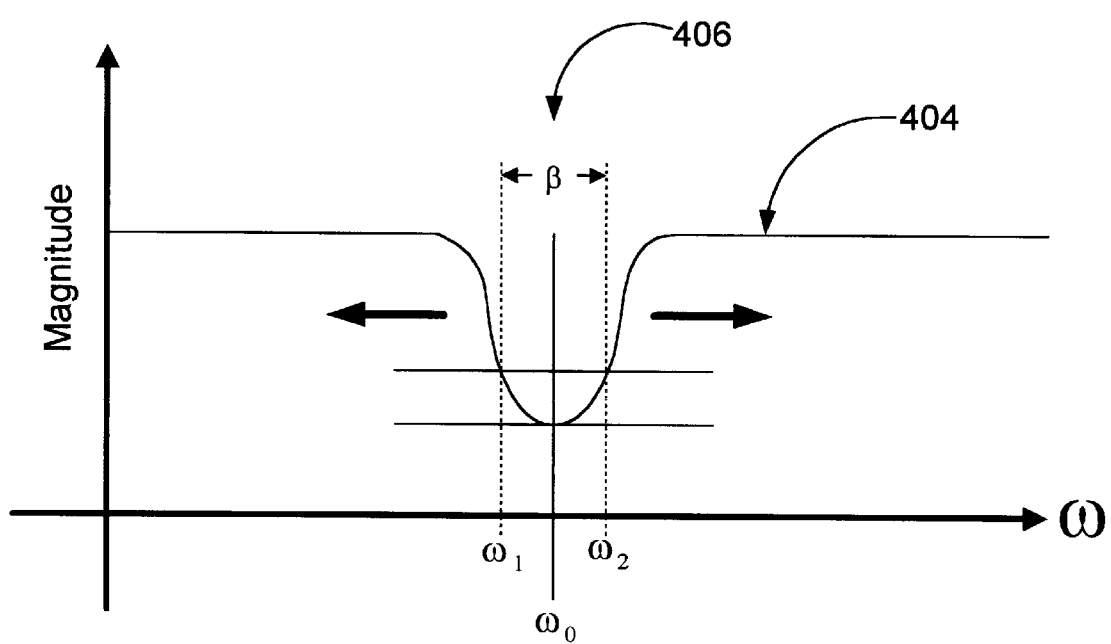
FIG. 8B is a graphical plot of the bandwidth of a resonant circuit of the temperature sensor or FIG. 8A.

Turning to FIG. 8B, shown is a graph of a frequency plot of the magnitude of an excitation signal 404 with a notch 406 created by the electromagnetic coupling of the variable resistance sensor 400 to the excitation signal source (not shown). The excitation signal 404 is comprised of multiple frequencies or "white noise." The variable resistance sensor 400 absorbs energy at the resonant frequency of its RLC circuit resulting in the notch 406. The bandwidth $\beta$ may be determined by finding the points on the notch 406 that are 3 db up from the center frequency $\omega_0$. These points lie at $\omega_1$ and $\omega_2$. The bandwidth $\beta$ is equal to the difference $\omega_2-\omega_1$.

It is understood that the resistance of the circuit includes the variable resistance 402 plus the resistance inherent in the conductors of the RLC circuit. However, it is further understood that the variable resistance 402 is large in comparison to the inherent resistance and predominates.

The variable resistance 402 can be chosen to effect change in response to any one of a number of factors. For example, the variable resistance may change with temperature, exposure to a specific chemical species, or other factor known by those skilled in the art. In fact, it is well known in the sensing art that there are a variety of materials the electrical resistance of which varies depending on the environment in which the materials are placed. Examples include chemical sensors based on semiconducting and other materials, strain sensors based on piezoresistive materials, and temperature sensors based on the change of the resistivity of the material with temperature.

Also, the discussion of micromachining techniques and the various materials that may be used in conjunction with the first embodiment applies equally to the fourth embodiment as well.

LCR Variable Resistance Sensor with Variable Pressure

Figure 9:
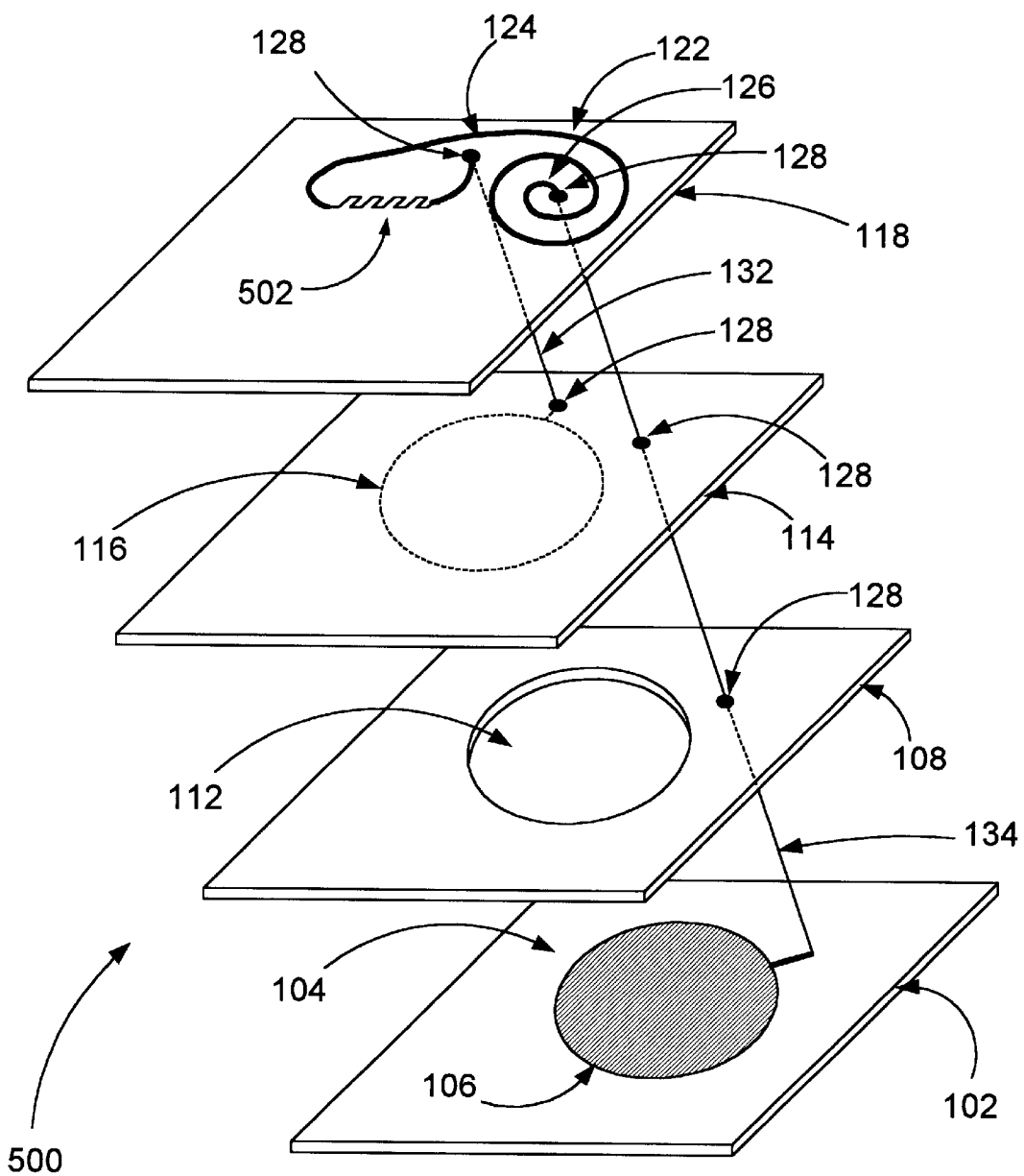
FIG. 9 is an assembly view of a dual pressure and temperature sensor according to a fifth embodiment of the present invention.

Referring to FIG. 9, shown is an assembly view of a combined pressure and temperature sensor 500 according to a fifth embodiment of the present invention. The temperature sensor 500 is similar to the pressure sensor 100 (FIG. 1) with the addition of a variable resistance 502 included in the resonant circuit. With respect to the variable resistance 502, the above discussion of the fourth embodiment of determining the variable resistance 402 (FIG. 8A) from the bandwidth of the resonant circuit is applied in determining the value of the variable resistance 402 of the fifth embodiment as well. In addition, the discussion of the first embodiment relating to the determination of the pressure based on the resonant frequency of the resonant circuit applies equally to the fifth embodiment. Note that since the pressure depends on the frequency of the circuit and the variable resistance is based on the bandwidth of the resonant circuit, both variables may be determined independently.

Finally, once again, the discussion of micromachining techniques and the various materials that may be used in conjunction with the first embodiment applies equally to the fifth embodiment as well.

Note it is a characteristic of all of the sensors described above that they are completely self-contained. In this context, self-contained means that the sensors do not require external wire leads to external circuitry or power sources, nor is there an optical coupling to the sensor to receive information. Also, an additional characteristic of all the sensors described herein is that they are completely passive in that no internal power sources, batteries, or active components such as transistors, etc., are employed within the sensors.

Excitation of the Resonant Circuits in the Sensors

The following discussion outlines various systems that may be employed to induce a current in the resonant circuits of the sensors described above.

Figure 10:
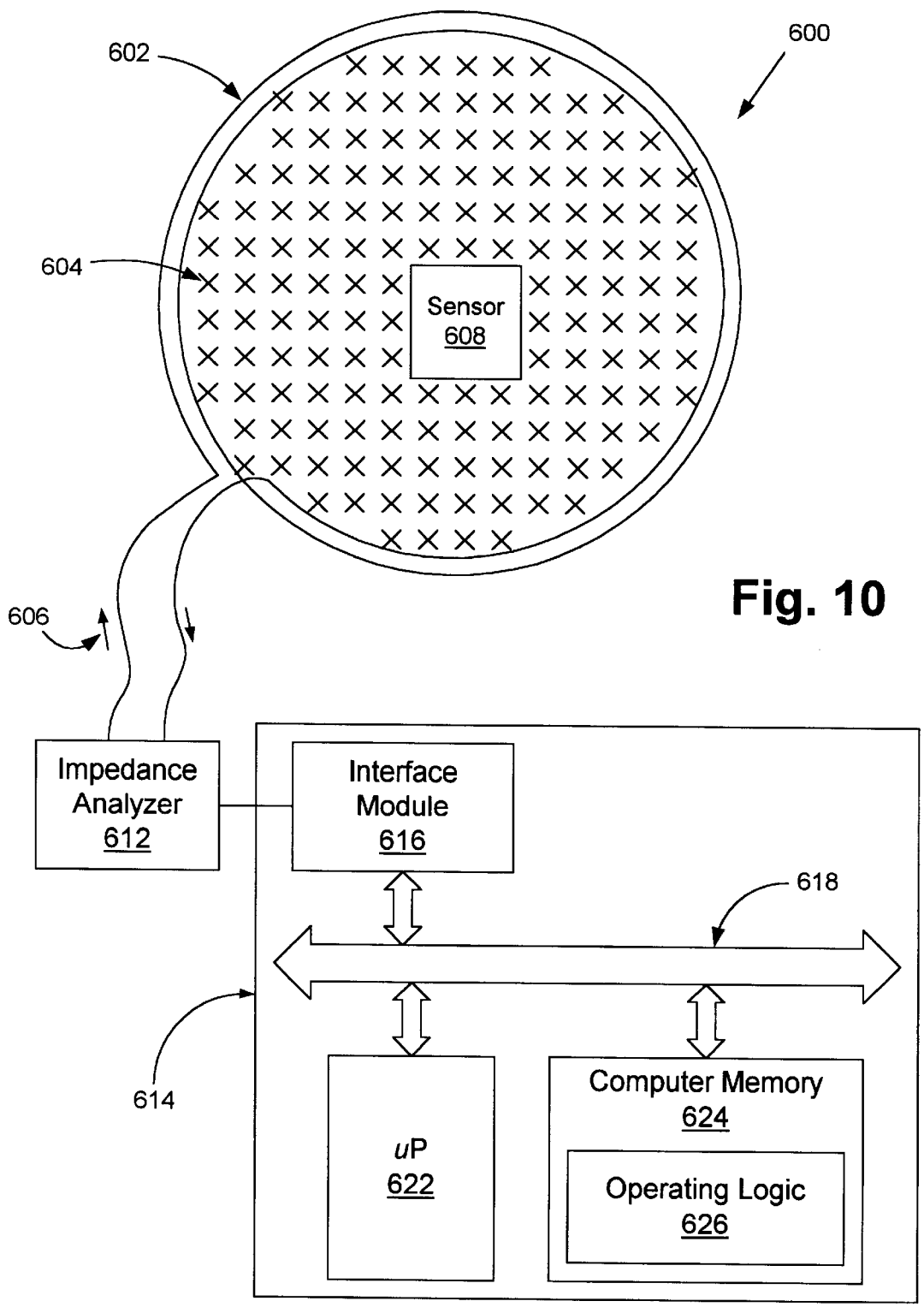
FIG. 10 is a block diagram of an excitation system that measures the impedance of the sensor.

Turning to FIG. 10, shown is an impedance excitation system 600 that may be applied in conjunction with any of the above described sensors. The impedance excitation system 600 is comprised of a transmitting antenna 602 which forms an electromagnetic field 604 is when an excitation signal 606 is applied. Disposed within the perimeter of the transmitting antenna 602 in the electromagnetic field 604 is a sensor 608. The sensor 608 may be any one of the sensors associated with the first, second, third, fourth, or fifth embodiments of the present invention discussed above. Note the location of the sensor 608 is such that the inductor coil resident on the sensor 608 is electromagnetically coupled to the transmitting antenna 602.

The transmitting antenna 602 is electrically coupled to an impedance analyzer 612 that in turn is electrically coupled to a computer system 614 through an interface module 616. The interface module 616 is electrically coupled to a data bus 618. The data bus 618 is electrically coupled to a processor 622 and a computer memory 624. The operating logic 626 by which the impedance excitation system 600 is controlled is stored on the computer memory 624.

During the operation of the impedance excitation system 600, the computer system 614 acting pursuant to the operating logic 626 measures the impedance of the transmitting antenna 602 by applying an excitation signal 606 with voltage of constant amplitude and measuring the magnitude and phase of the resultant current while varying the frequency across a predetermined frequency range. The sensor 608 is electromagnetically coupled to the transmitting antenna 602. When the frequency of the excitation signal 602 is equal to the resonant frequency of the resonant circuit of the sensor 608, then an increase in current of the excitation signal 606 is seen due to a corresponding drop in the impedance of the resonant circuit. The computer system 614 detects this change in current/impedance and may determine the resonant frequency and the bandwidth of the resonant circuit of the sensor 608.

Figure 11:
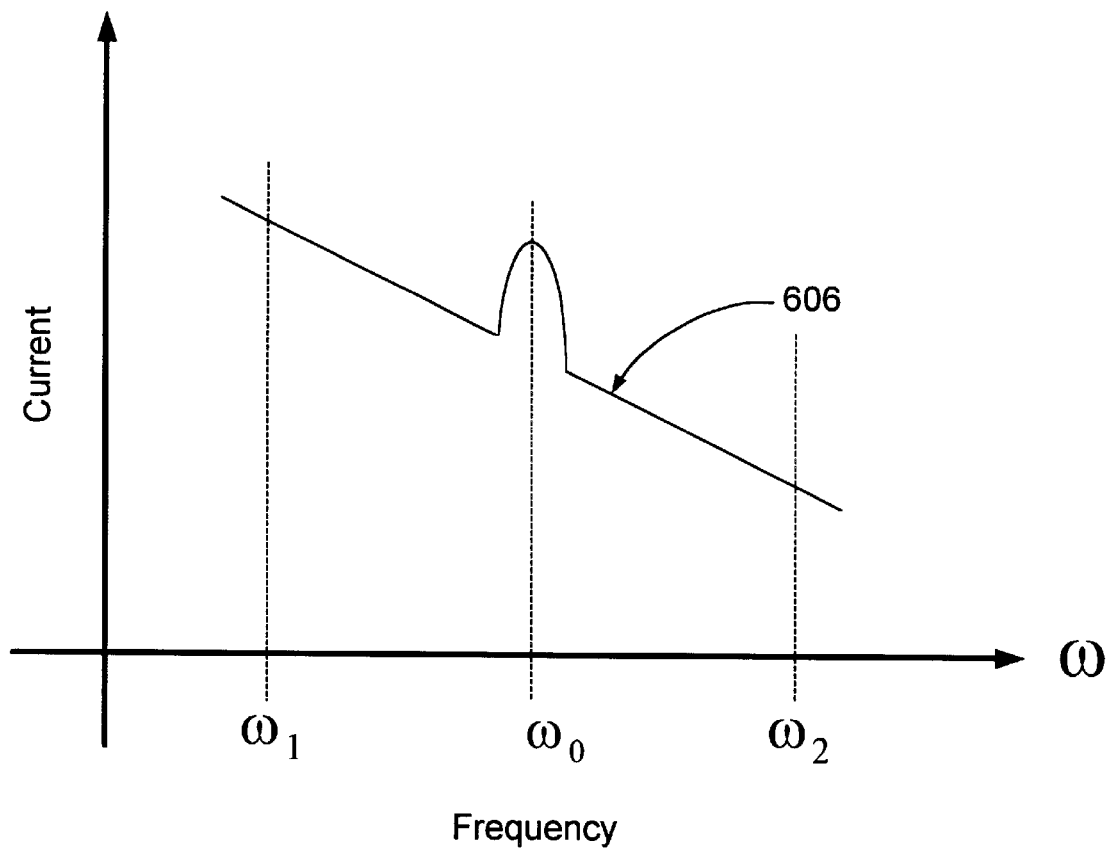
FIG. 11 is a graphical plot of the current through the transmitting antenna as determined by the excitation system of FIG. 10.

Referring to FIG. 11, shown is a plot of the frequency spectrum of the magnitude of the current through the transmitting antenna 602 (FIG. 10). The frequencies at which the impedance is measured ranges from $\omega_1$ to $\omega_2$ as shown. At the resonant frequency $\omega_0$ of the resonant circuit in the sensor 608 (FIG. 10), the impedance of the transmitting antenna 602 drops and the current peaks, interrupting the purely inductive behavior of the transmitting antenna 602 observed at frequencies $\omega$ far from the resonant frequency $\omega_0$.

An alternative approach involves measuring the phase angle difference between the voltage applied to the transmitting antenna 602 and the measured current in the transmitting antenna 602. At frequencies far from the resonant frequency $\omega_0$, the phase difference will approach 90°. At the resonant frequency $\omega_0$, the phase difference drops to a minimum value, allowing determination of the resonant frequency $\omega_0$ and bandwidth from the notch created. Unlike the impedance and current behavior, the phase is relatively constant at frequencies far from the resonant frequency $\omega_0$, which may simplify measurement in some cases.

Figure 12:
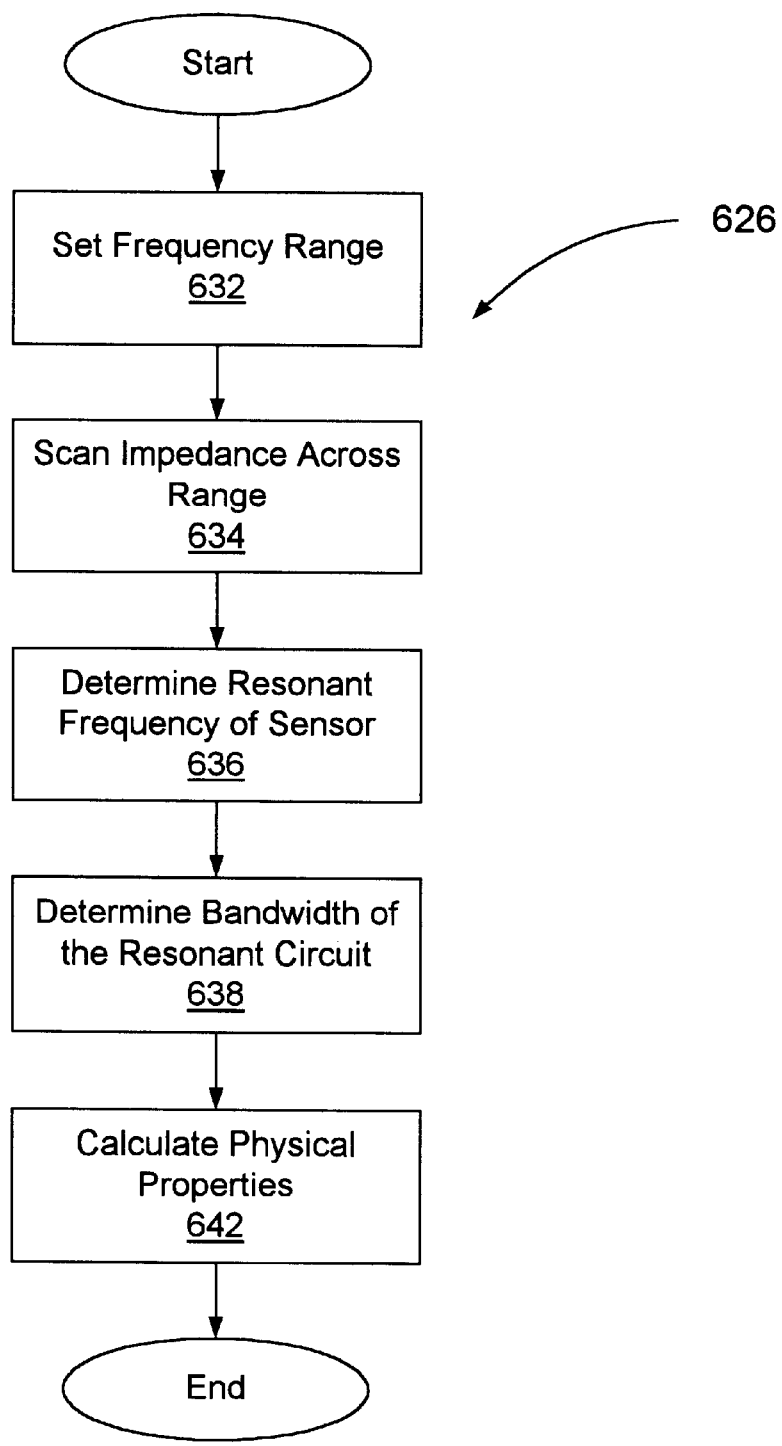
FIG. 12 is a flow diagram of the operating logic employed by the excitation system of FIG. 10.

Turning then to FIG. 12, shown is a flow chart of the operating logic 626 that controls the impedance excitation system 600. In block 632, the frequency range at which the impedance of the transmitting antenna 602 (FIG. 10) operates is set. Next, in block 634, the impedance of the transmitting antenna 44 is scanned with an excitation signal 606 (FIG. 10) with frequency varying across the predetermined range. In block 636, the resonant frequency of the resonant circuit of the sensor 608 (FIG. 10) is determined by examining the center frequency $\omega_0$ (FIG. 11) of the peak in the current. In block 638, the bandwidth of the resonant circuit of the sensor 608 is determined. Finally, in block 642 the physical properties linked to the resonant frequency and the bandwidth are ascertained. Note it is not necessary to perform the steps in blocks 638 or 642. These blocks are executed only if necessary to calculate the specific physical property depending upon the type of sensor 608 employed. Also, in a further operation, the temperature calibration discussed in the third embodiment may be performed.

Figure 13:
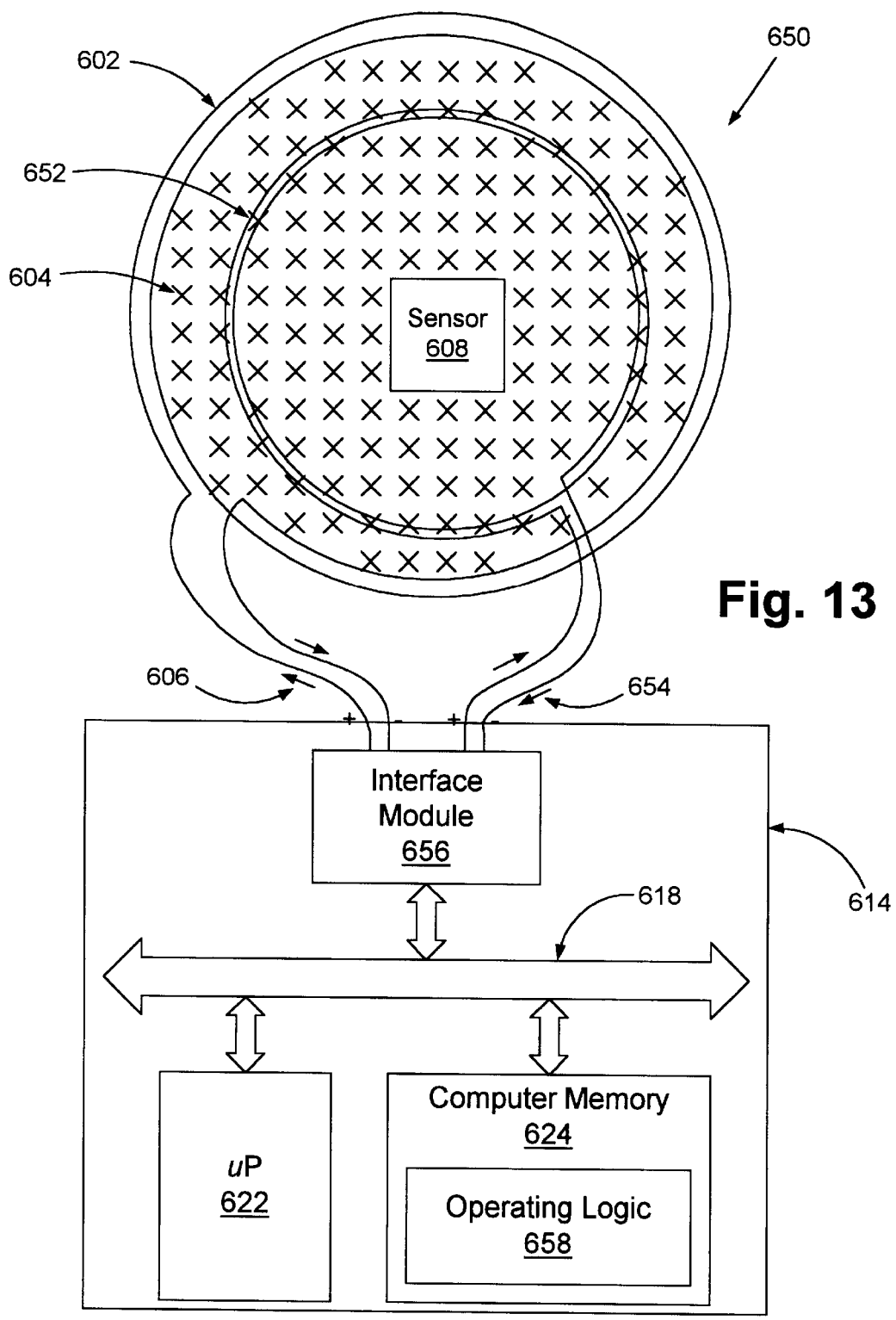
FIG. 13 is a block diagram of an excitation system that uses a transmit and receive antenna.

Referring next to FIG. 13, shown is a transmit/receive excitation system 650 that may be applied in conjunction with the above described sensors. The transmit/receive excitation system 650 features a transmitting antenna 602 which forms a time-varying electromagnetic field 604 is when an excitation signal 606 is applied. Disposed within the perimeter of the transmitting antenna 602 in the electromagnetic field 604 is a sensor 608. The sensor 608 may be any one of the sensors associated with the first, second, third, fourth, or fifth embodiments of the present invention discussed above.

The transmit/receive excitation system 650 also includes a receiving antenna 652. Note that the relative positions of the transmitting antenna 602 and the receiving antenna 652 are such that they are not concentric. As shown, the receiving antenna 652 is in front of the transmitting antenna 602. The goal of the placement of the receiving antenna relative to the placement of the transmitting antenna 602 and the sensor 608 is to allow the receiving antenna to capture as much electromagnetic flux that has traveled through the sensor 608 within its periphery. This placement takes into consideration the path of the flux of the electromagnetic field 604 which is understood by those skilled in the art.

Both the transmitting antenna 602 and the receiving antenna 652 are in electrical communication with the computer system 614 through the interface module 656 which provides an interface between the transmitting and receiving antennas 602 and 652 and the data bus 618. The data bus 618 is electrically coupled to a processor 622 and a computer memory 624. The operating logic 658 by which the transmit/receive excitation system 650 is controlled is stored on the computer memory 624.

Next, the general operation of the transmit/receive excitation system 650 is described. According to the first embodiment, pursuant to the operating logic 658, the computer control system 614 applies a predetermined excitation signal 606 to the transmitting antenna 602. Or, put another way, together, the computer control system 614 and the transmitting antenna 602 act as a transmitter that transmits the excitation signal 606. The excitation signal 606 is transmitted in the form of a time-varying electromagnetic field 604. The electromagnetic field 604 in turn induces a current in the sensor 608 and the receiving antenna 57. Thus, according to the present invention, the resonant circuit in the sensor 608 is electromagnetically coupled to the transmitting antenna 602, or alternatively, the transmitter. Likewise, the receiving antenna 652 is electromagnetically coupled to the transmitting antenna 602.

The current induced in the resonant circuit of the sensor 608 oscillates at the resonant frequency of the sensor circuit. In effect, the sensor 608 robs energy from the electromagnetic field 652 centered at its resonant frequency. The loss of energy from the electromagnetic field 604 is observed in the received signal 654. In other words, the received signal 654 is a modified version of the excitation signal 606 due to the energy loss. The computer control system 614 determines the precise center frequency $\omega_0$ of the energy loss, thereby determining the resonant frequency of the resonant circuit of the sensor 608. The computer control system 614 also calculates the bandwidth of the resonant circuit based on the received signal 654.

Figure 14A:
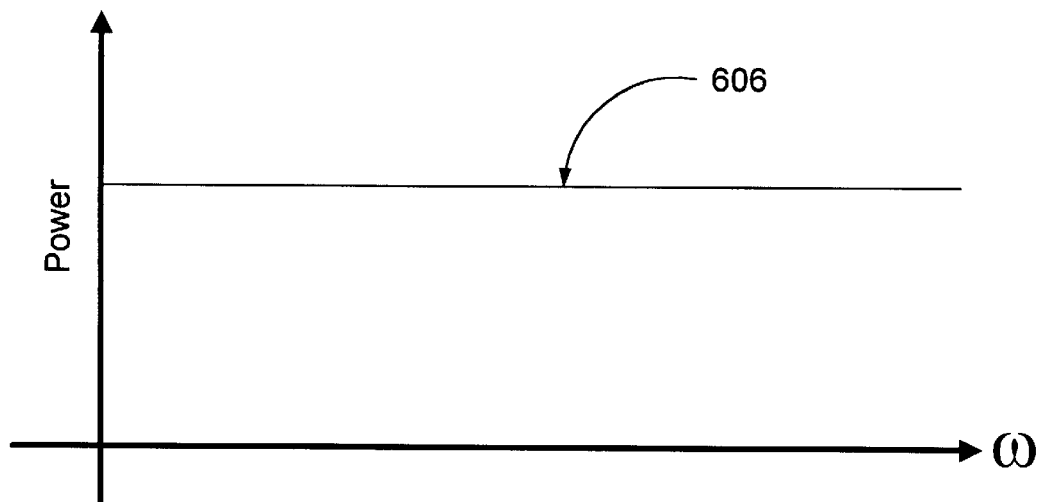
FIG. 14A is a graphical plot of a frequency spectrum of an excitation signal transmitted by the excitation system of FIG. 13.

Turning to FIG. 14A, shown is a plot of the frequency spectrum of the excitation signal 606 (FIG. 13). The magnitude of the curve is either the power of the excitation signal 606, and varies with the frequency $\omega$. The excitation signal 606 is typically referred to as "white noise" in that the magnitude is constant over the entire span of frequencies being transmitted.

Figure 14B:
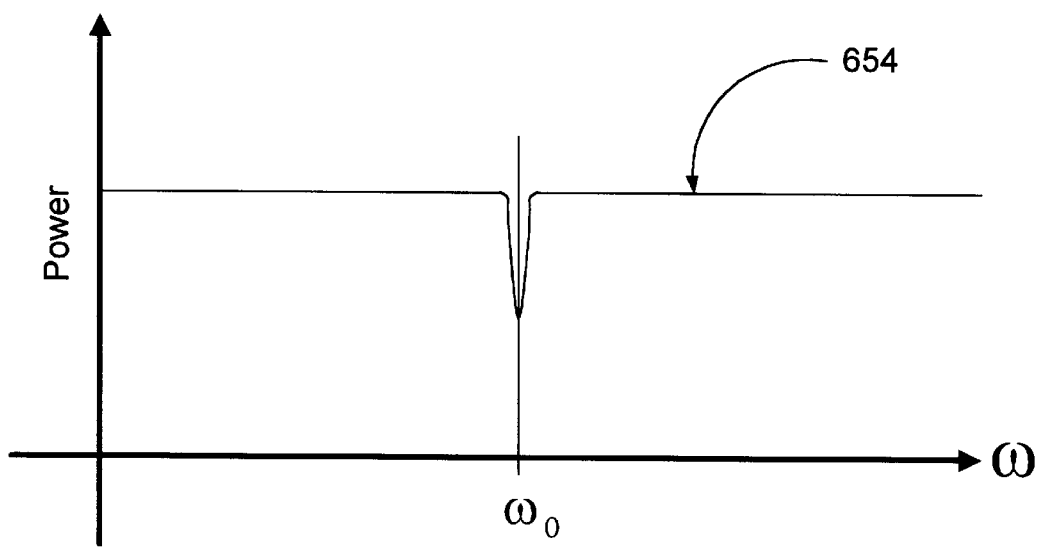
FIG. 14B is a graphical plot of a frequency spectrum of an excitation signal received by the excitation system of FIG. 13.

Turning to FIG. 14B, shown is a graph of the frequency spectrum of the received signal 654. This frequency plot is essentially the same as the frequency spectrum of the excitation signal 606 (FIG. 14A) except a notch is seen with a center frequency $\omega_0$. The notch represents the energy that was absorbed by the sensor 608 (FIG. 13). If the phase of the received signal 654 is shown, then the notch is a dip in the phase. The center frequency $\omega_0$ is the resonant frequency of the resonant circuit of the sensor 608.

Figure 15:
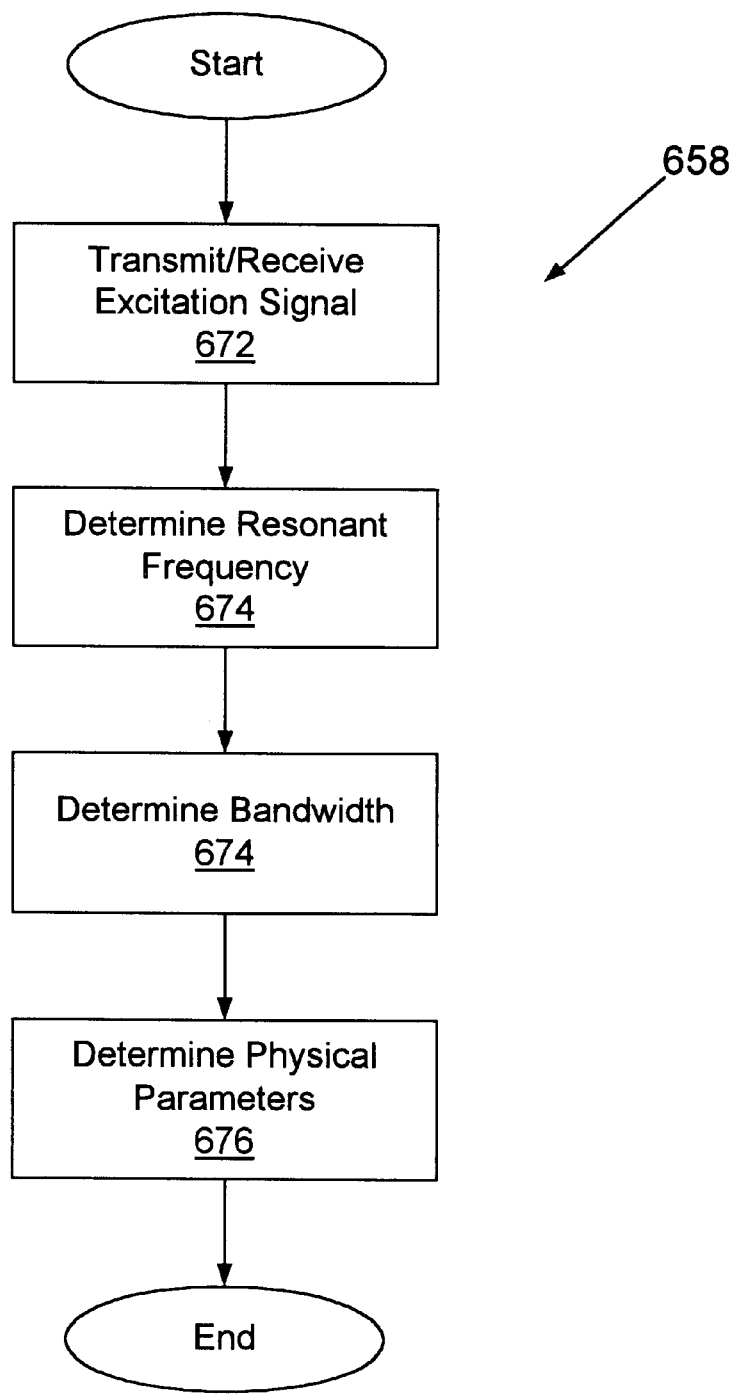
FIG. 15 is a flow diagram of the operating logic employed by the excitation system of FIG. 13.

Referring next to FIG. 15, shown is a flow chart of the operating logic 658. In block 672, an excitation signal is transmitted and received via the transmitting and receiving antennas 602 and 652 (FIG. 13). In block 674, the resonant frequency of the resonant circuit is determined based upon the center frequency $\omega_0$. Next, the bandwidth of the resonant circuit is determined from the received signal 654 (FIG. 13). Finally, in block 676, the desired physical parameters of the environment surrounding the sensor 608 are determined either from the resonant frequency or the bandwidth.

Figure 16:
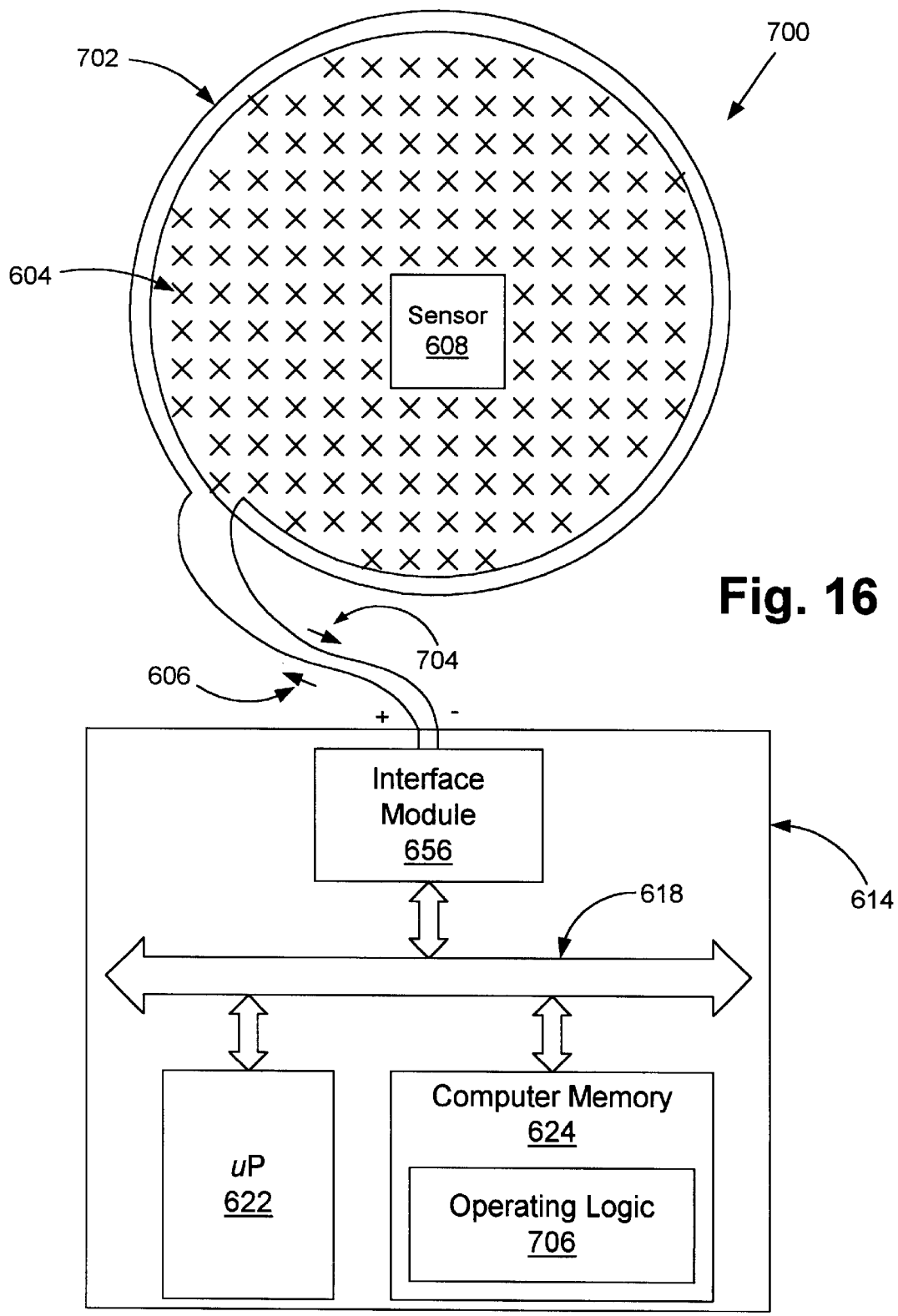
FIG. 16 is a block diagram of a chirp excitation system that uses a single antenna.

Turning next to FIG. 16, shown is a chirp excitation system 700 that may be applied in conjunction with the above described sensors The chirp excitation system 700 is similar to the transmit/receive excitation system 650 (FIG. 16) with the exception that a single antenna 702 is used for both transmitting and receiving. The excitation signal 704 is a chirp that includes all frequencies or white noise for a specific duration of time. After the excitation ceases, the system reverts to a listen mode and the return signal 704 generated by the sensor 608 pursuant to the operating logic 706 is received by the single antenna 702. The operating logic 706 is similar to the operating logic 658 (FIG. 15) with the exception that a single antenna 702 is used. Consequently, the operating logic 658 is not described in detail.

Figure 17A:
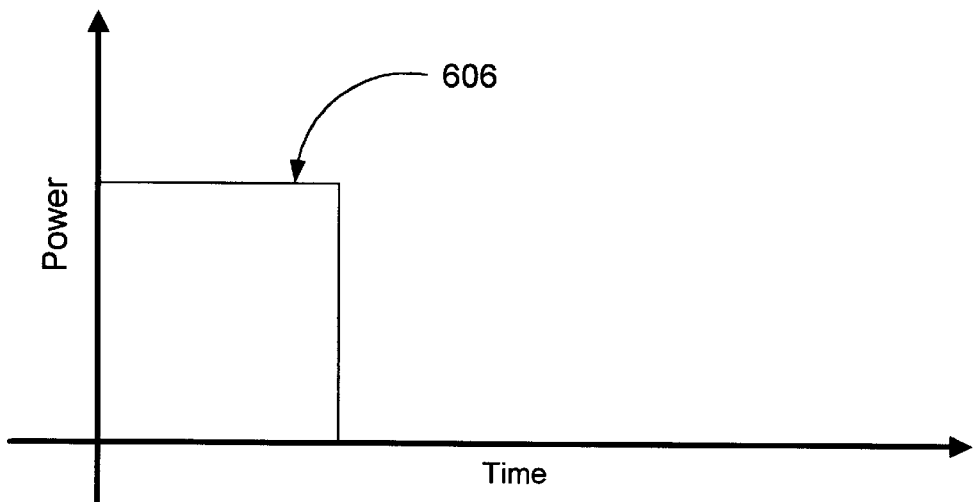
FIG. 17A is a graphical plot of an excitation signal employed in the chirp excitation system of FIG. 16.

With reference to FIG. 17A, shown is a plot of the frequency spectrum of the excitation signal 606 (FIG. 16). The magnitude of the curve is either the power of the excitation signal 606, and varies with the frequency $\omega$. The excitation signal 606 is typically referred to as "white noise" in that the magnitude is constant over the entire span of frequencies transmitted.

Figure 17B:
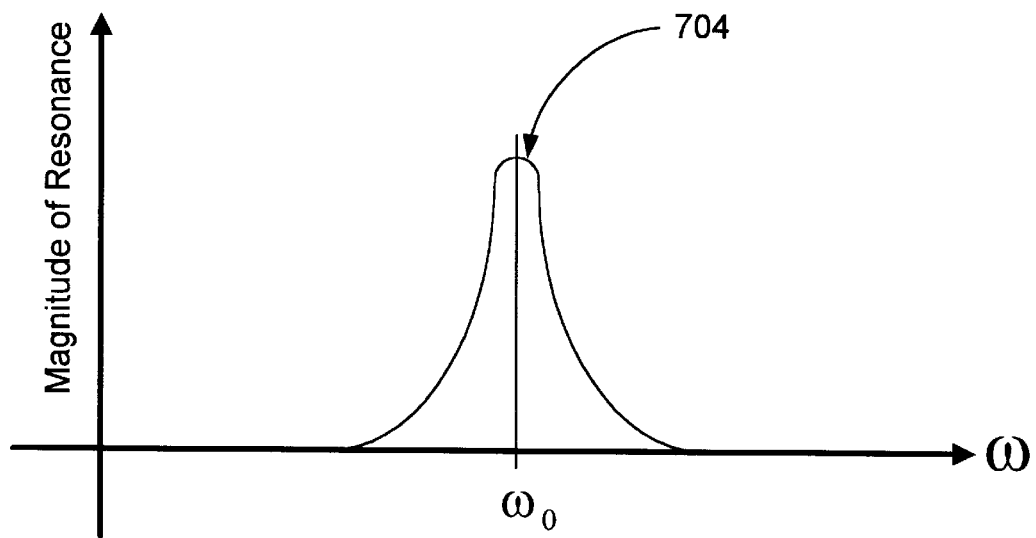
FIG. 17B is a graphical plot of a received signal in the chirp excitation system of FIG. 16.

Referring to FIG. 17B, shown is a graph of the frequency spectrum of the received signal 704. Basically there exists a peak at frequency $\omega_0$, which is the resonant frequency of the resonant circuit on the sensor 608 (FIG. 16). The center frequency $\omega_0$ is the resonant frequency of the resonant circuit of the sensor 608.

Figure 18:
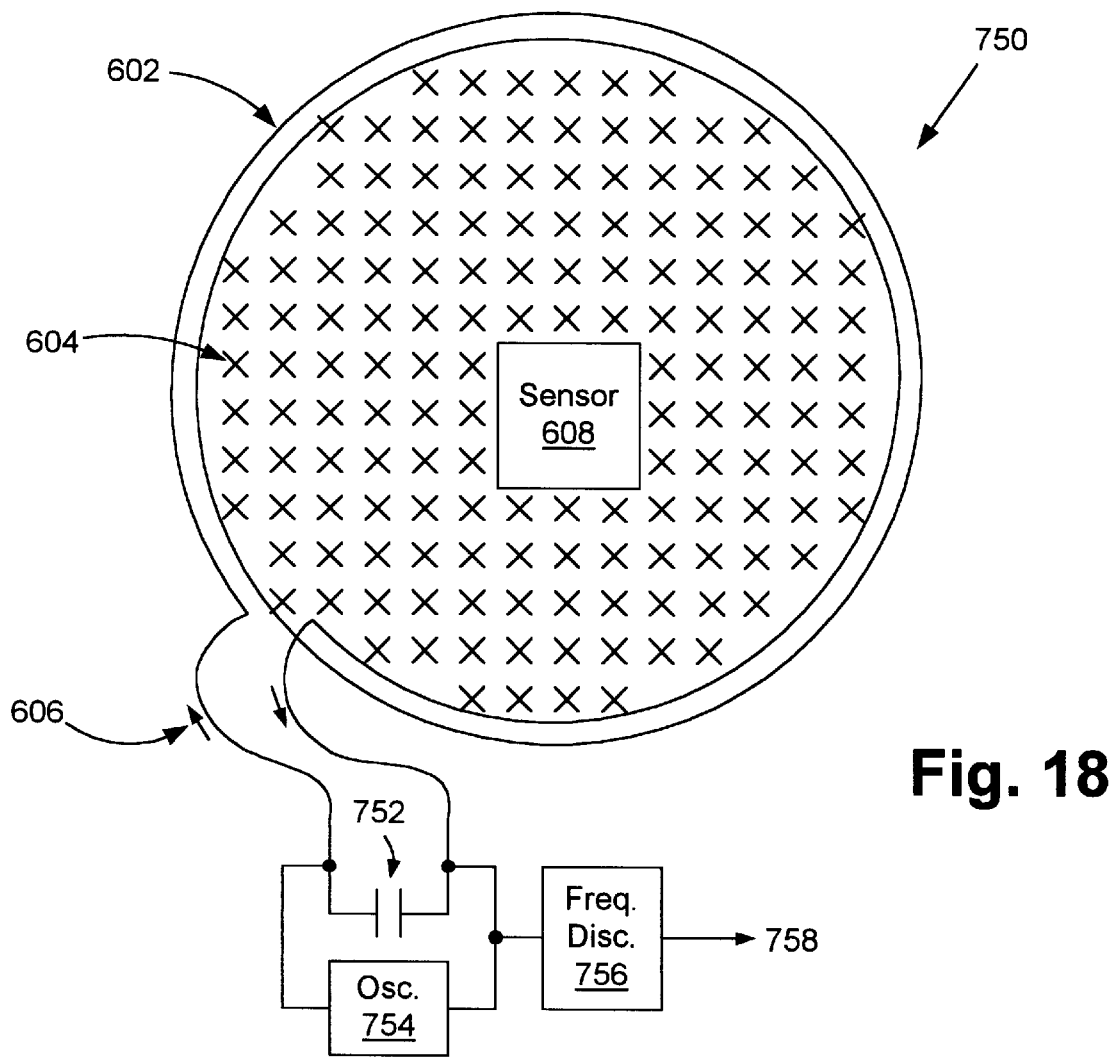
FIG. 18 is a block diagram of an excitation signal system employing a tank circuit.

Turning to FIG. 18, shown is an oscillator excitation system 750 that may be applied in conjunction with the above described sensors. The component parts of the oscillator excitation system 750 include a transmitting antenna 602. When an excitation signal 606 is applied to the transmitting antenna 602, an electromagnetic field 604 is induced in the center of the transmitting antenna 602. A sensor 608 is placed within the perimeter of the transmitting antenna 602 within the electromagnetic field 604.

The transmitting antenna 602 is electrically coupled in parallel with a capacitor 752. Together the transmitting antenna 602, which in electrical terms is an inductor, coupled with the capacitor 752 make a resonant circuit or tank circuit. The common terminals of the transmitting antenna 602 and the capacitor 752 are electrically coupled to the input and output of an oscillator 754 as shown. The output of the oscillator 754 is electrically coupled to a frequency discriminator 756. The frequency discriminator 756 produces an output signal 758 that may be a DC voltage, direct current, or other signal. By placing the sensor 608 within the electromagnetic field 604, the sensor 608 is electromagnetically coupled to the transmitting antenna 602.

Next the operation of the above circuit is described. The oscillator 754 produces an electrical signal that resonates at the resonant frequency of the tank circuit created by the transmitting antenna 602 and the capacitor 752. The signal oscillates at a frequency determined by the electrical characteristics of the tank circuit as is known by those skilled in the art. The resonant frequency of the tank circuit is altered by the electromagnetic coupling with the sensor 608.

The oscillating signal from the oscillator 754 is then fed into a frequency discriminator which then converts the frequency signal to a corresponding voltage or other signal that is related to the sensor modified frequency of the oscillator circuit. The resonant frequency of the sensor 608 is determined from this signal.

Referring to FIG. 19, shown is the impedance excitation system 600 that was depicted in FIG. 10 with a number of sensors 608a–608d. The present invention offers a distinct advantage in that several sensors 608 may be employed in the same environment at the same time. The use of multiple sensors 608 simultaneously can provide redundant and more accurate measurement of a physical characteristic measured. Also, several different physical characteristics may be measured at the same time, or spatial resolution of physical characteristics may be determined. The use of multiple sensors 608 involves configuring each sensor 608 to operate within a specific unique frequency band in a scheme much like frequency multiplexing.

Also note, the multiple sensor 608d features multiple resonant circuits similar to the combination sensor 300 (FIG. 7). As this implies, the multiple sensor 608d may have any number of individual resonant circuits, and, consequently, individual sensors which will sense any number of physical parameters resident on the same sensor structure. The precise method in which multiple sensors 608d can be formed so as to be resident on the same sensor structure by, for example, spatial repetition of the lithographic patterns used to form individual sensors during the manufacturing process, is known to those skilled in the art and is not discussed in detail here.

Figure 20:
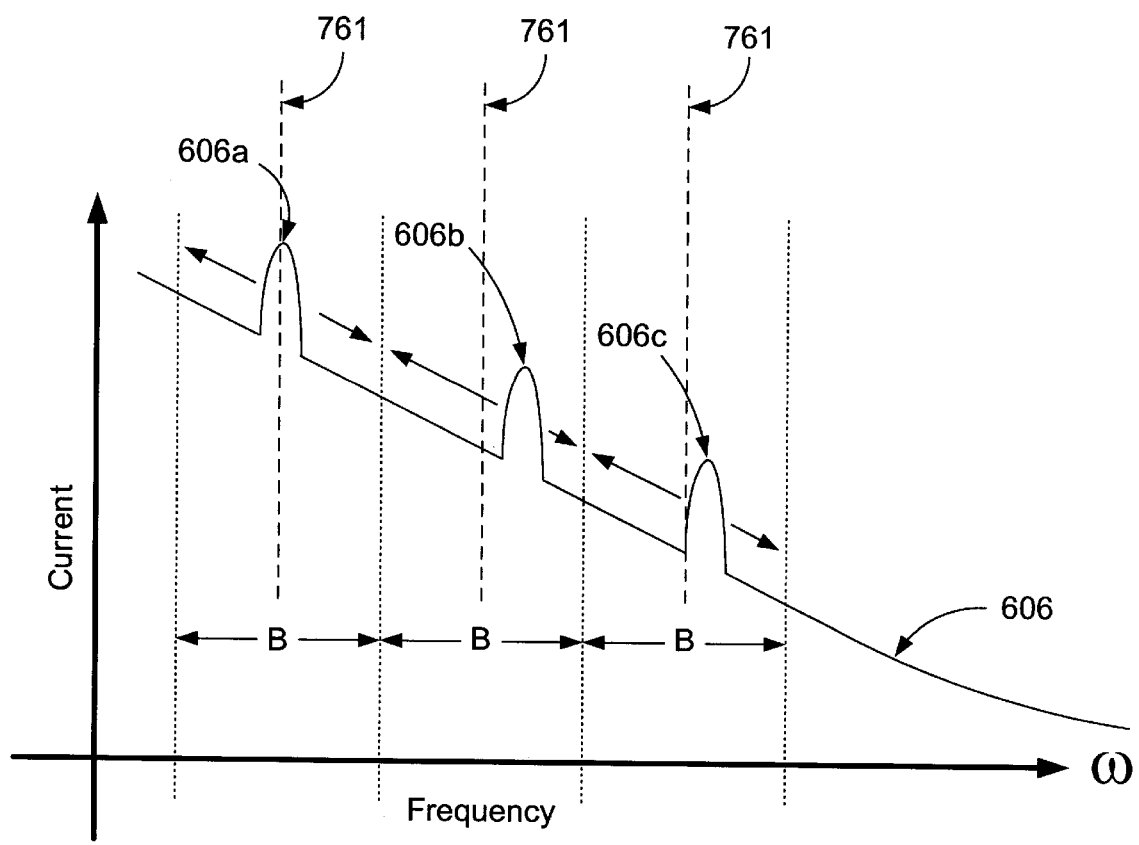
FIG. 20 is a graphical plot of the current generated by a frequency scan of the multiple sensors of FIG. 19.

Turning then, to FIG. 20, shown is a plot of the frequency spectrum of the magnitude of the current of the excitation signal 606 through the transmitting antenna 602 (FIG. 19). The frequency spectrum is partitioned, by way of example, into three specific frequency bands B. The excitation signal 606 shows three peaks 606a–606c, each peak corresponding to a single sensor 608a–608c (FIG. 19), although there is not a peak for the multiple sensor 608d (FIG. 19), the peaks being for illustration purposes. Within each frequency band B is a center frequency 761. The resonant circuits of the sensors 608 are advantageously designed so that the center frequency 761 is at the center of the range of frequencies within which the resonant circuits operate. This arrangement allows each sensor to relay information relating to a physical condition in the same environment without interference with each other. Consequently, values obtained for a physical parameter such as pressure or temperature may be averaged to obtain greater accuracy etc. Also, several different physical characteristics may be measured at the same time, or spatial resolution of physical characteristics may be determined.

While the foregoing includes discussion on various embodiments of the sensors produced using bulk machining approaches, the present invention also includes embodiments or the various sensors that are created using surface machining approaches as well as approaches that combine bulk and surface machining. The following discussion includes these embodiments.

Surface Machined Pressure Sensor

Figure 21A:
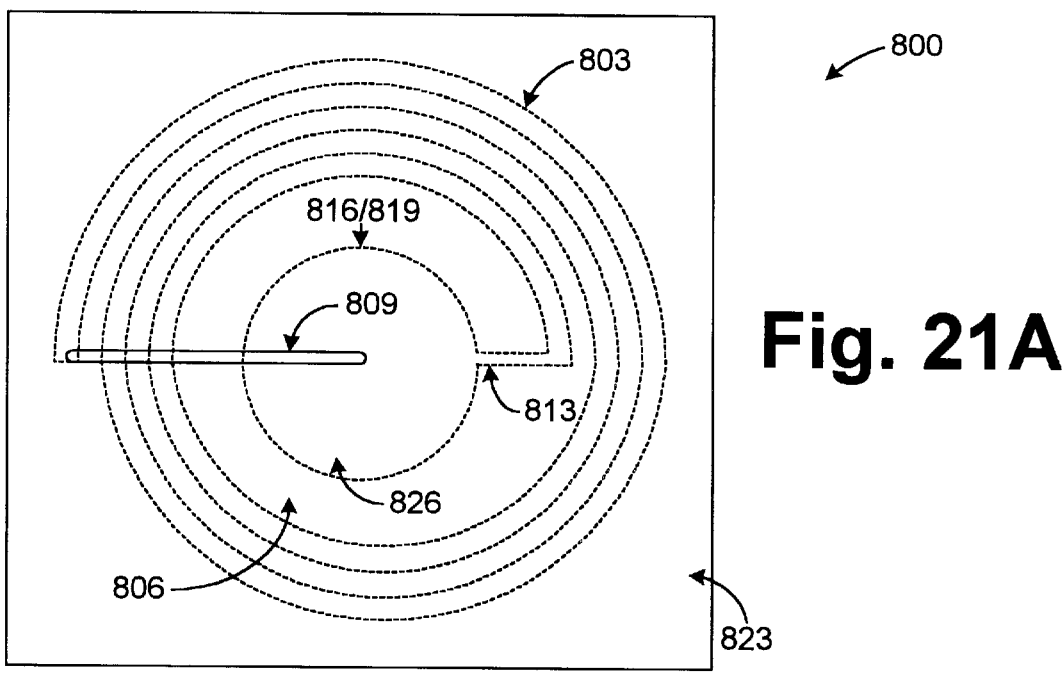
FIG. 21A is a top view of pressure sensor produced by surface machining techniques using a substrate according to another embodiment of the present invention.

Turning then, to FIG. 21A, shown is a top view of a pressure sensor 800 according to another embodiment of the present invention. The pressure sensor 800 includes a resonant circuit that comprises an inductor coil 803 and a capacitor 806. The inductor coil 803 and the capacitor 806 are electrically coupled via a first connector 809 and a second connector 813. The capacitor 806 is comprised of first and second plates 816 and 819, of which only the second plate 819 is viewable from the top view of the pressure sensor 800 shown. A structural layer 823 covers the inductor coil 803 and defines a cavity 826 between the first and second plates 816 and 819.

Figure 21B:
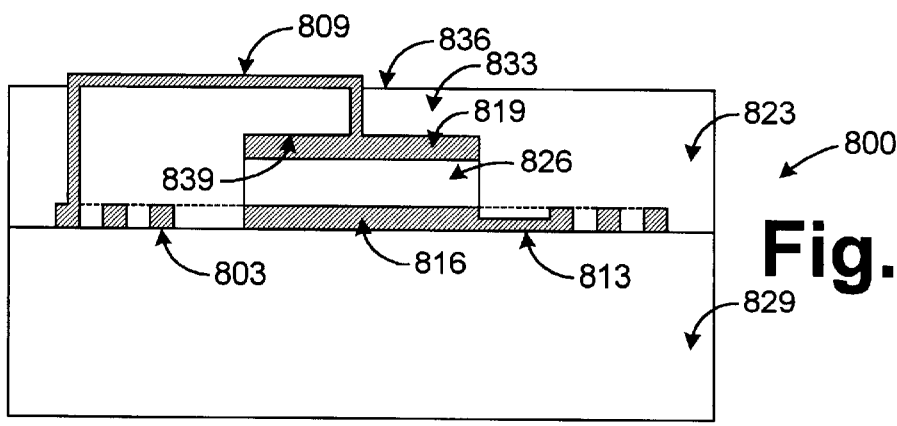
FIGS. 21B–F are side views of various pressure sensors in surface machined configurations similar to the pressure sensor of FIG. 21A.

With reference to FIG. 21B, shown is a side view of the pressure sensor 800. According to an embodiment of the present invention, the structural layer 823, inductor coil 803, and first plate are disposed on a substrate 829 as shown. The structural layer 823 defines the cavity 826, thereby forming a diaphragm 833. The diaphragm 833 includes an exterior surface 836 and an interior surface 839. The diaphragm 833 is movable upon the application of a pressure to the exterior surface 836. The second plate 819 is affixed to the interior surface 839 of the diaphragm 833 as shown. The first plate 816 of the capacitor 806 is affixed to the substrate where the cavity 826 that is defined by the structural layer 823 is situated there between. The movement of the diaphragm 833 causes corresponding movement of the second plate 819 thereby altering the capacitance of the capacitor 806 due to the fact that the first and second plates 816 and 819 have a variable relative position depending on the pressure applied to the external surface 836.

Figure 21C:
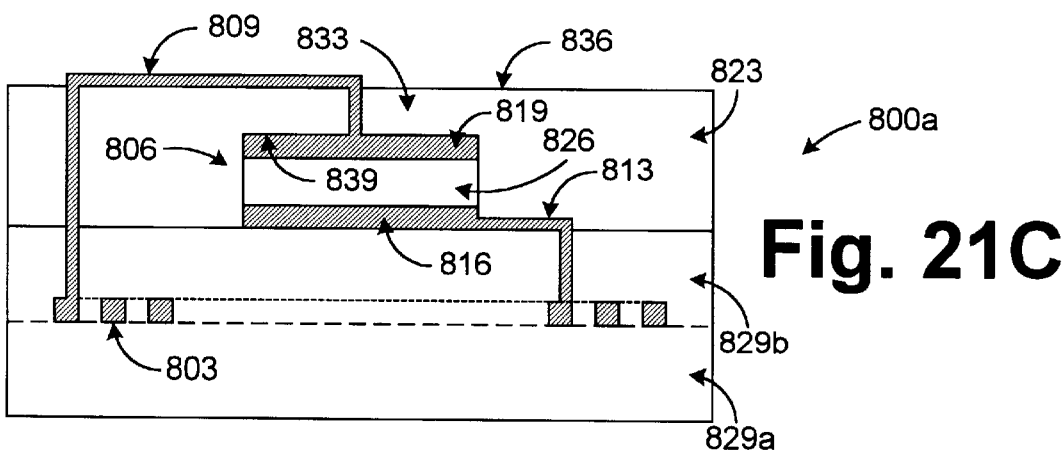

In FIG. 21C, shown is a pressure sensor 800a in which the inductor coil 803 is embedded within the substrate 829. In particular, the substrate 829 is comprised of a first layer 829a and a second layer 829b. The inductor coil 803 is placed upon the first layer 829a and, thereafter, the second layer 829b is placed over the first layer thereby covering the inductor coil 803.

Figure 21D:
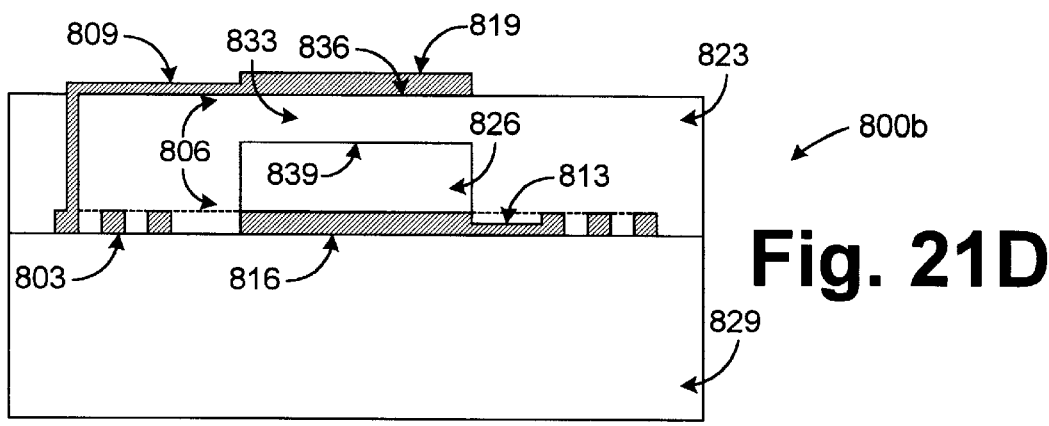
Figure 21E:
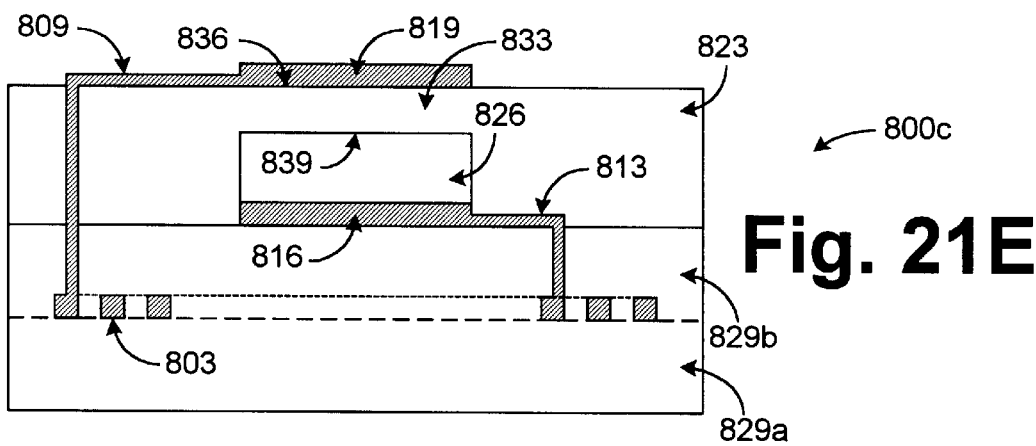
Figure 21F:
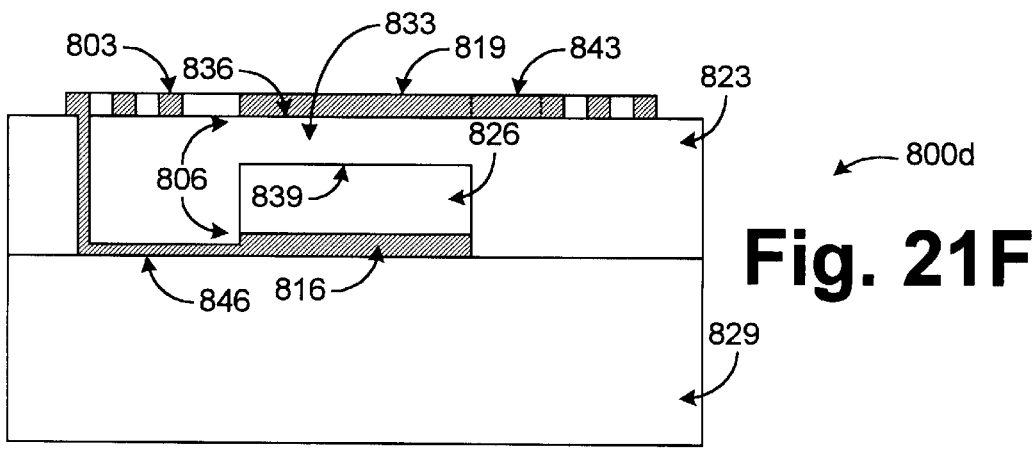

Turning to FIG. 21D, shown is a pressure sensor 800b according to another embodiment of the present invention. The pressure sensor 800b is similar to the pressure sensor 800, except for the fact that the second plate 819 is located on the exterior surface 836 of the diaphragm 833 as shown. In FIG. 21E, the same configuration as FIG. 21D is employed except that the inductor coil 803 is located within the substrate 829 where there are two layers 829a and 829b in a similar manner to the pressure sensor 800a of FIG. 21C. Finally, with respect to FIG. 21F, shown is a pressure sensor 800d in which the inductor coil 803 is located on top of the structural layer 823. The second plate 819 is also located on the exterior surface 836 of the diaphragm 833. A first electrical connection 843 couples the second plate 819 to the inductor coil 803, and a second electrical connection 846 couples the inductor coil 803 at the opposite end of the inductor coil 803 to the first plate 816. Note that all of the pressure sensors 800–800d as shown in FIGS. 21A–21F have exposed electrical conductors outside of the structural layer 823. It would be possible to place a second structural layer on top of these exposed electrical components to insulate them from external objects or substances as needed by a particular application. However, it is important that any such second structural surface that is added on top of the structural layer 823 allow sufficient movement of the diaphragm 833 so as to cause a corresponding change in the capacitance of the capacitor 806. The addition of a second structural surface to prevent exposure of electrical components to an external environment applies generally to all of the various embodiments of sensors discussed herein.

With respect to FIGS. 21A–21D, a variety of materials may be used for the electrical components including the inductor coil 803, capacitor 806, and connectors 809 and 813, etc., including copper, aluminum, gold, tungsten, silver, palladium, platinum, chromium, molybdenum, tantalum, iron, nickel, doped silicon, and other conductor materials known in the micromachining, microfabrication, and electronic packaging art. Likewise, a number of materials may be used for the structural layer 829 and the substrate 829 depending upon the specific environment for which the resulting sensor is constructed. For example, for relatively low temperature applications, organic materials may be employed such as polymeric films of polyethylene terephthalate (e.g., mylar), polyimide (e.g., Kapton), epoxy, rubber and other elastomers, and other polymeric and non-polymeric organic structural materials known in the chemical engineering, micromachining, microfabrication, and electronic packaging art. In addition, inorganic materials or organic/inorganic composites may be employed such as metal foils (with suitable electrical insulation between the structural and electrical components of the sensor), silicon, silicon dioxide, silicon nitride, low temperature glasses, epoxy-glass composites, carbon fiber composites, and other materials known in the structural engineering, micromachining, microfabrication, and electronic packaging art.

For high temperature applications, refractory metals such as tungsten and molybdenum (with suitable electrical insulation between the structural and electrical components of the sensor), high-temperature glasses, quartz, ceramic materials such as alumina and alumina-glass composite ceramics and other similar materials may be employed. In addition, for corrosive or other harsh environments, materials such as inert polymeric (e.g., Teflon) or diamond-ike coatings may be employed. For exemplary discussions of such materials and bulk and surface machining techniques that may be employed to create the sensors as discussed herein, reference is made to Tummala et al., "Microelectronics Packaging Handbook, Semiconductor Packaging, Part II," Chapman & Hall, New York, 1997, and to Madou, "Fundamentals of Microfabrication," CRC Press, Boca Raton, Fla., 1997, the entire texts of which are expressly incorporated herein by reference.

Note that all discussion above relative to the materials employed in the various approaches including bulk machining and surface machining relates to all embodiments of the invention discussed herein where applicable and is not restricted to a particular manufacturing approach, etc.

Bulk Machined Inductor Coil

Figure 22:
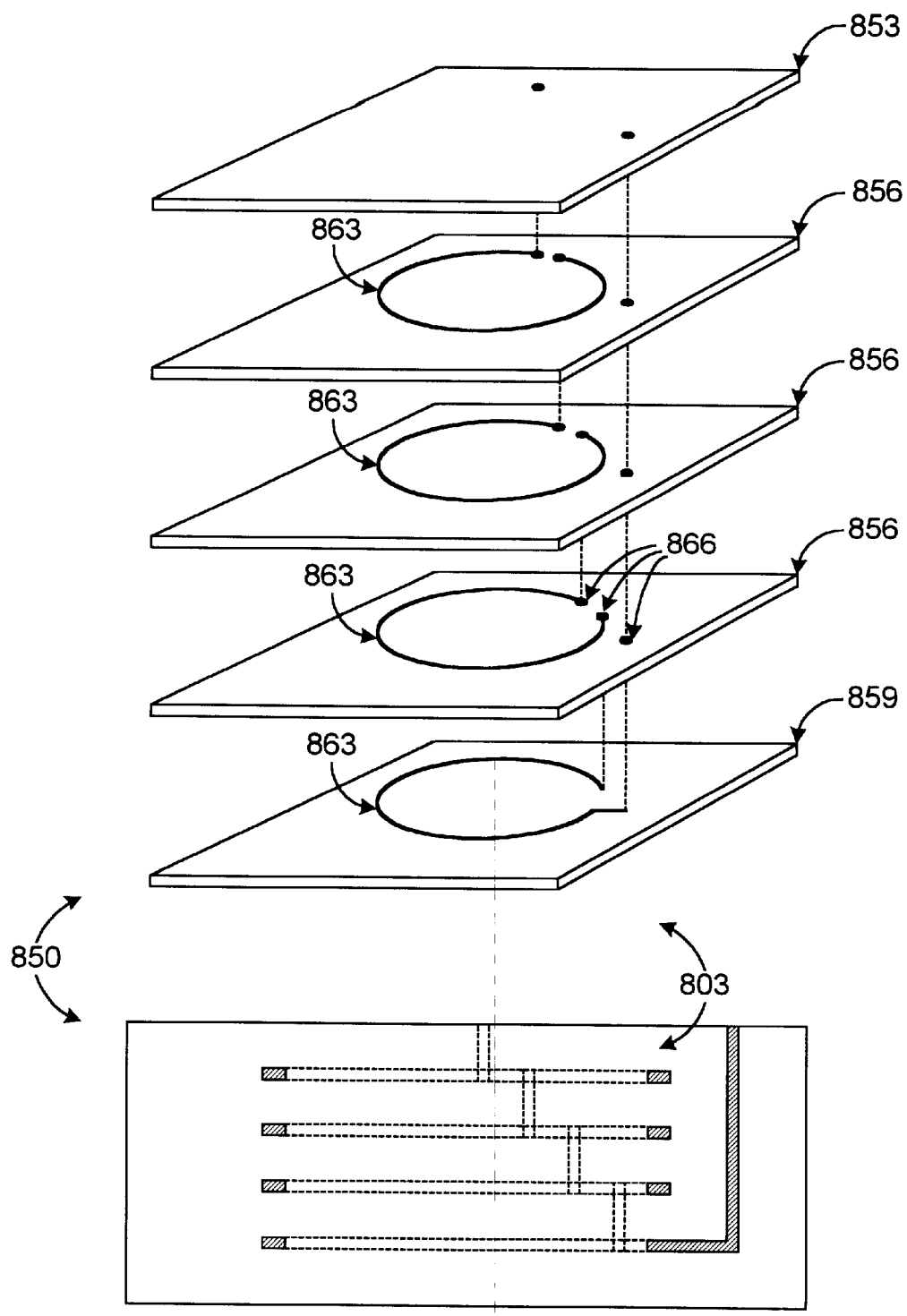
FIG. 22 is a drawing of an inductor coil produced by bulk machining techniques.

With regard to FIG. 22, shown is a bulk-machined inductor coil assembly 850 according to another embodiment of the present invention. The assembly 850 comprises a first layer 853, one or more middle layers 856, and a bottom layer 859. The middle layers 856 and the bottom layer 859 each have a conductive ring 863 located thereon. The conductive rings 863 are electrically coupled in series by way of a number of vias 866 thereby forming an inductor coil 803. The top layer 853 includes two vias 866 through which both ends of the inductor coil 803 can be electrically coupled to other components. Note that the top layer 853 is unnecessary in cases in which further components are mounted on top of the first middle layer 856 adjacent to the top layer 853 that do not short or otherwise establish improper electrical coupling with the conductive ring 863 situated thereon. The various layers 853, 856, and 859 are arranged as shown in FIG. 22 and then sandwiched together and cured in a furnace as known by those skilled in the art, thereby resulting in a bulk machined inductor coil assembly 850 according to an embodiment of the present invention. The bulk machined inductor coil assembly 850 may be employed as a substrate for the various embodiments of the pressure sensor shown with reference to FIGS. 21A–21F and the embodiments to be described hereinafter.

Surface Machined Pressure Sensor using Bulk Machined Inductor Coil

Figure 23:
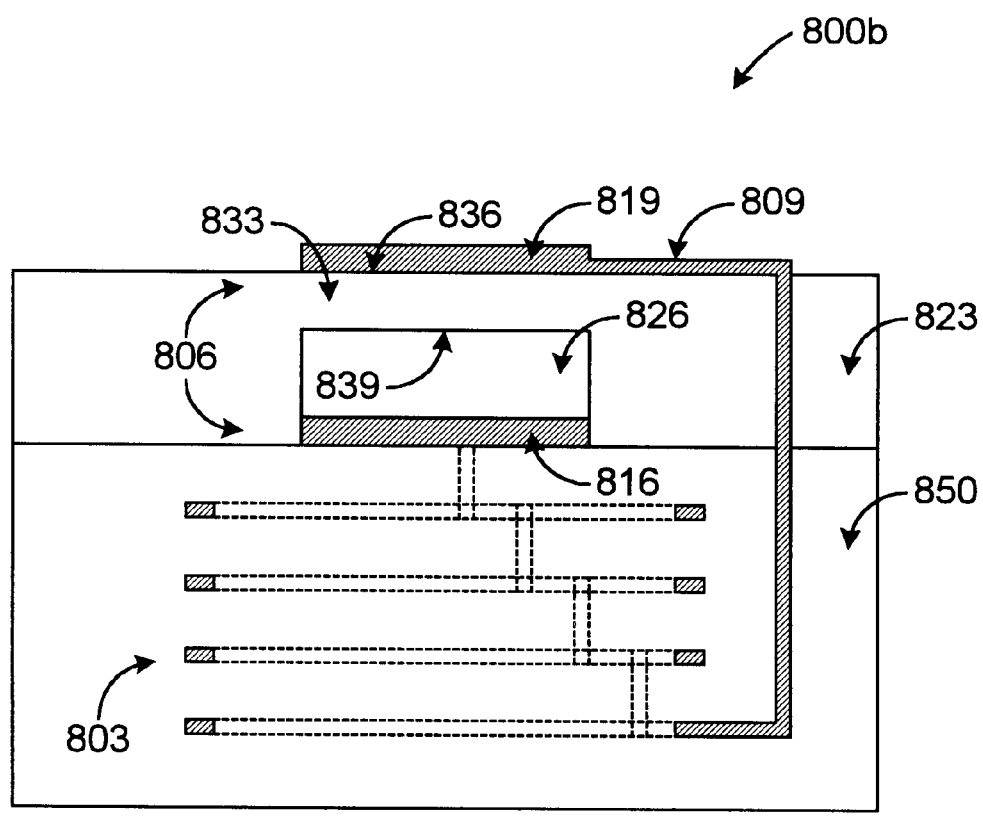
FIG. 23 is a side view of a pressure sensor produced using surface machining techniques with the bulk surface machined inductor coil of FIG. 22 used as a substrate.

Turning then to FIG. 23, shown is an embodiment of the pressure sensor 800b in which the second plate 819 of the capacitor 806 is placed on the exterior surface 836 of the diaphragm 833 as shown. The cavity 826 formed by the structural layer 823 in the diaphragm 833 is located between the first and second plates 816 and 819 as discussed hereinabove. Note that the inductor coil 803 is coupled to the first plate and the second plate as shown. The bulk-machined inductor coil assembly 850 is best used as the substrate for the surface machined pressure sensor components.

Surface Machined Temperature Sensor (Variable Capacitance)

Figure 24A:
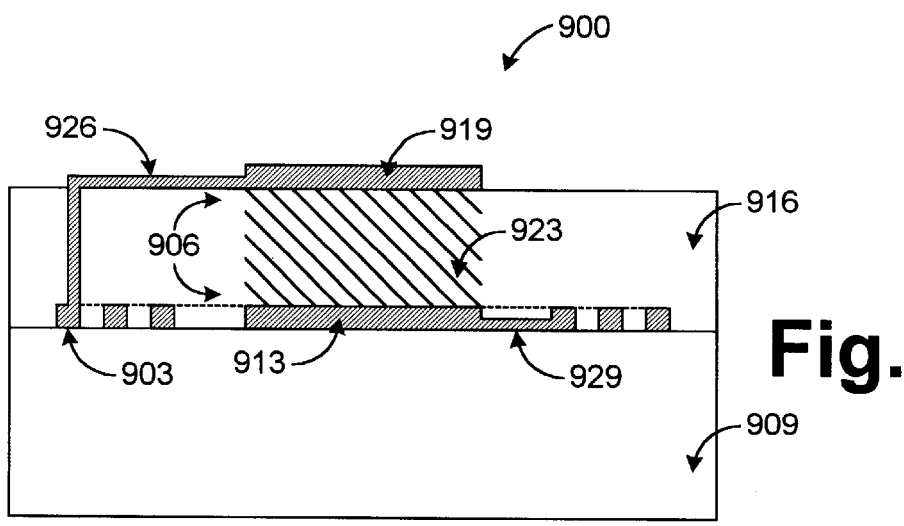
FIGS. 24A–B are side views of a temperature sensor produced using surface machining techniques.

With reference to FIG. 24A, shown is temperature sensor 900 according to another embodiment of the present invention. The temperature sensor 900 includes an inductor coil 903 that is electrically coupled to a capacitor 906. The temperature sensor 900 is manufactured using surface machining techniques beginning with a substrate 909. An inductor coil 903 and a first plate 913 are placed on the substrate 909 using an acceptable technique such as stencil printing, screen printing, lamination, or other acceptable method. Thereafter, a structural layer 916 is applied to the substrate 909, the inductor coil 903, and the first plate 913. A second plate 919 is disposed on top of the structural layer 916 opposite the first plate 913. The structural layer 916 includes a dielectric region 923 between the first and second plates 913 and 919.

The material making up the dielectric region 923 is selected to have a permittivity that varies with temperature, thereby causing the capacitance of the capacitor 906 to vary with changing temperature. Note that the material the makes up the dielectric region 923 may be the same material that makes up the rest of the structural layer 916, or it may be different, depending upon the particular application for which the temperature sensor 900 is designed. The inductor coil 903 is electrically coupled to the capacitor 906 via first and second conductive members 926 and 929. The first conductive member 926 may be established through the structural layer 916 using chemical etching, laser etching, or other suitable method. The second conductive member 929 may be placed on the substrate 909 along with the first plate 913 and the inductor coil 903.

Figure 24B:
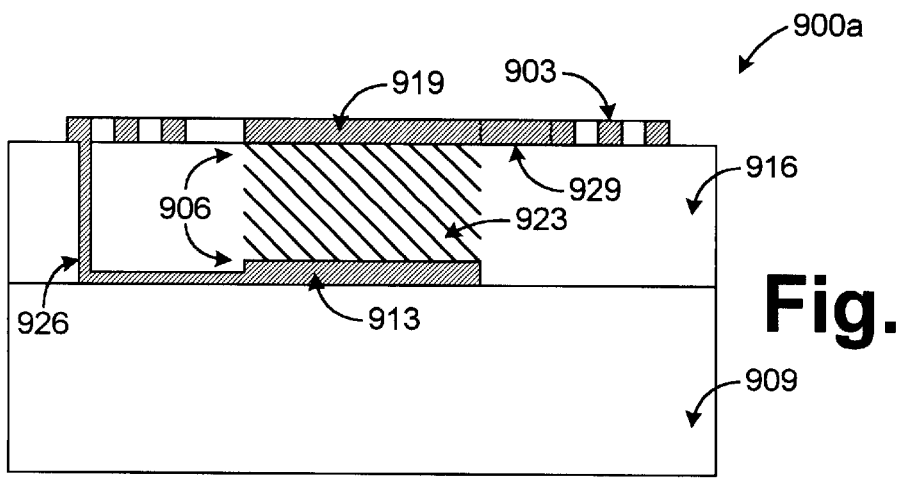

With reference to FIG. 24B, shown is a temperature sensor 900a according to another embodiment. The temperature sensor 900a is nearly the same as the temperature sensor 900, with the exception that the inductor coil 903 is located on top of the structural layer 916. In another embodiment, a second structural layer may be added on top of the inductor coil 903 to prevent the conductive members of the resonant circuit from being exposed to outside atmosphere, etc. Note that any second structural layer should be comprised of a type of material so as not to materially inhibit the flow of heat to and from the dielectric region 923. This is because it is the temperature fluctuation of the dielectric region 923 that causes a change in the capacitance of the capacitor 906 that ultimately is converted into a temperature reading.

Figure 24C:
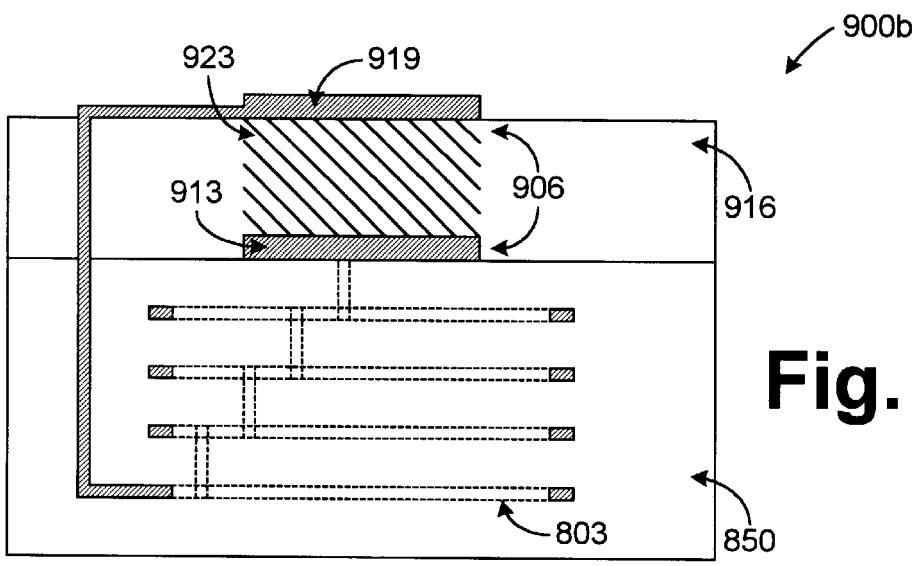
FIG. 24C is a side view of a temperature sensor produced using surface machining techniques with the bulk surface machined inductor coil of FIG. 22 used as a substrate.

In addition, with reference to FIG. 24C, shown is a temperature sensor 900b that employs the bulk-machined inductor coil assembly 850 with the inductor coil 803 as shown. In this embodiment, the bulk machined inductor coil assembly 850 is employed as the substrate 909 (FIGS. 24A and 24B), where the ends of the inductor coil 803 are coupled to the first and second plates 913 and 919 of the capacitor 906.

Surface Machined Temperature/Chemical Species Sensor (Variable Resistance)

Figure 25A:
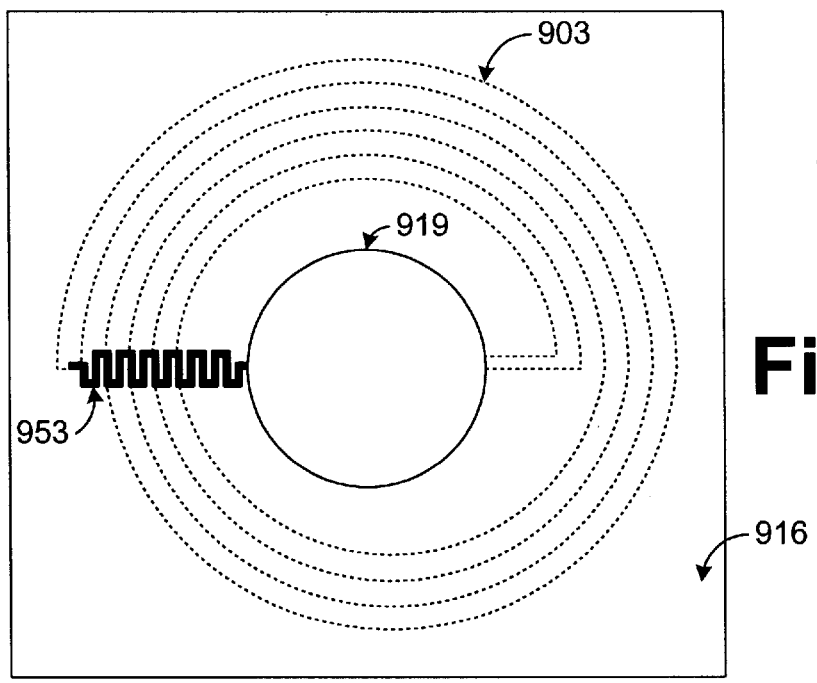
FIG. 25A is a top view of a temperature sensor produced using surface machining techniques.
Figure 25B:
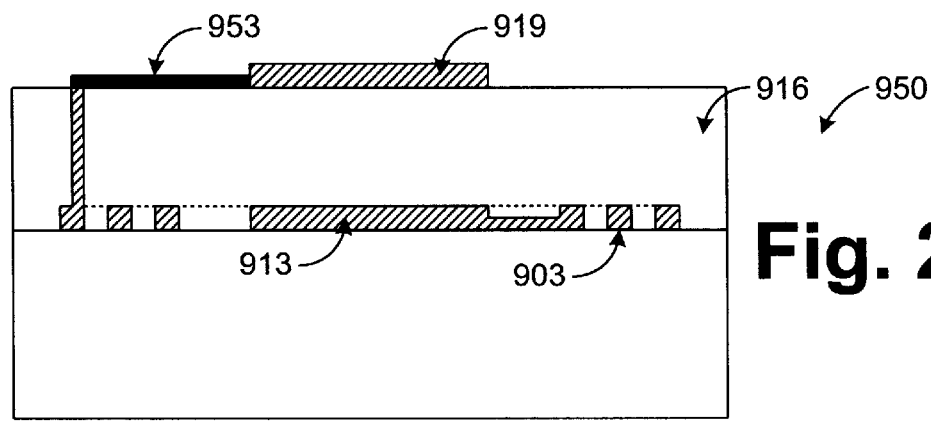
FIG. 25B is a side view of a temperature sensor of FIG. 25A.
Figure 25C:
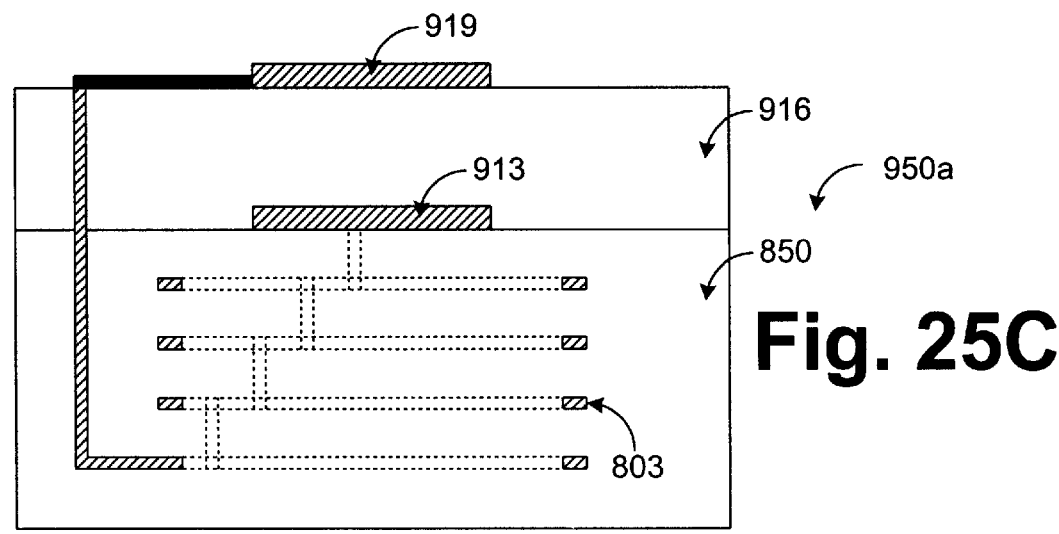
FIG. 25C is a side view of a temperature sensor produced using surface machining techniques with the bulk surface machined inductor coil of FIG. 22 employed as a substrate.

With reference to FIGS. 25A–25B, shown are a top view and a side view of a temperature sensor 950 according to another embodiment of the present invention. The temperature sensor 950 is similar to the temperature sensor 900 (FIG. 24A) with the exception that the dielectric region 923 (FIG. 24A) is excluded. In addition, a variable resistor 953 electrically couples the second plate 919 to the inductor coil 913 on the outer surface of the structural layer 916. The actual resistance of the variable resistor 953 changes with the temperature of the variable resistor 953. Thus, the temperature sensor 950 detects the temperature of the surrounding environment by examining the resistance of the variable resistor 953. The change in resistance is detected by examining a bandwidth of the resonant circuit as discussed previously. Note that a dielectric region 923 (FIG. 24A) may be included in the temperature sensor 950 to provide a redundant measurement of temperature by examining the center frequency of the resonant circuit as discussed previously. Such may be desirable in cases where accurate measurement of the temperature is an optimum. FIG. 25C includes a temperature sensor 950a that includes the bulk-machined inductor coil assembly 850 as discussed previously.

In addition, the variable resistor 953 may have a resistance that changes with the presence of a chemical species in the surrounding environment rather than the temperature of the environment. The chemical species may be any molecular substance or element that effects the resistance of the variable resistor 953. As the concentration of the chemical species increases or decreases, so does the resistance of the resistor 953.

Surface Machined Combination Pressure and Temperature Sensor

With reference to FIG. 26, shown is a combination pressure and temperature sensor 980 according to another embodiment of the present invention. The sensor 980 includes a combined substrate 829/909 on which the pressure sensor 800b and the temperature sensor 900 are created using surface machining techniques. The structure and functionality of the pressure sensor 800b and the temperature sensor 900 individually as part of the combination pressure and temperature sensor 980 is generally the same as was discussed with reference to FIGS. 24A and 21D. The combination pressure and temperature sensor 980 illustrates how any combination of the various configurations of the pressure, temperature, and chemical species sensors discussed previously may be included in a single sensor. Note that the combination pressure and temperature sensor 980 is not restricted to the use of the pressure sensor 800b and the temperature sensor 900 as two or more of all of the previous surface machined sensors could be included in a combination sensor as shown. In addition, the substrate 829/909 could be constructed similar to the bulk machined inductor coil assembly 850 (FIG. 22), only including two or more inductor coils 803 (FIG. 22) that are part of two or more sensors.

Surface Machined Combination Pressure and Temperature/Chemical Species Sensor

Figure 27A:
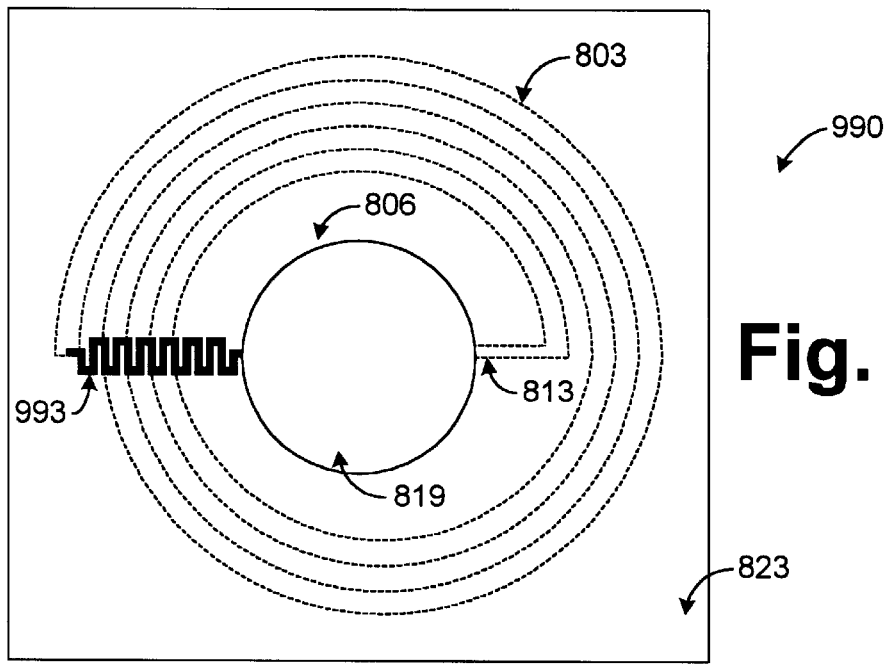
FIG. 27A is a top view of a combination pressure and temperature sensor produced using surface machining techniques.
Figure 27B:
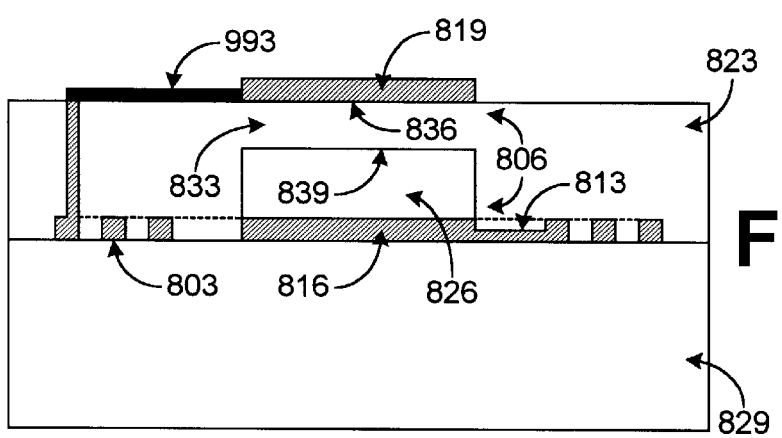
FIG. 27B is a side view of the combination pressure and temperature sensor of FIG. 27A.

Turning then, to FIGS. 27A–27B shown is a combination pressure and temperature sensor 990 that employs a variable resistor 993 according to another embodiment of the present invention. The combination sensor 990 includes a single resonant circuit having an inductor coil 803 and a capacitor 806. The capacitor 806 includes a first plate 816 and a second plate 819. The first plate 816 is electrically coupled to the inductor coil 803 via a first connector 813. The first plate 816 and the inductor coil 803 are located on the substrate 829 via lamination or other surface mount method. A structural layer 823 is placed over the inductor coil 803 and the first plate 816, the structural layer 823 defining the cavity 826 above the first plate 816 with a diaphragm 833. As with the previously described pressure sensors 800–800d (FIGS. 21A–21F), the diaphragm 833 includes an exterior surface 836 and an interior surface 839. The diaphragm 833 moves upon the application of pressure against the exterior surface 836. The second plate 819 is located on the exterior surface 836 of the diaphragm 833 where the cavity 826 is situated between the first and second plates 816 and 819. Note, however, that the second plate 819 may also be mounted on the inner surface of the diaphragm 833 and the inductor coil 803 may be located on the outer surface of the structural layer 823 or within the substrate 829, etc. Due to the movement of the diaphragm 833 with changing pressure, the resonant circuit will have a resonant frequency that changes with the pressure of the environment in which the sensor 990 is place.

In addition, the variable resistor 993 may have a resistance that changes with changing temperature or with the presence of a chemical species in the surrounding environment. The chemical species may be any molecular substance that effects the resistance of the variable resistor 993. As the concentration of the chemical species increases or decreases, so does the resistance of the resistor 993. In such a circumstance, it may be preferable to locate the second plate 819 on the inner surface 839 of the diaphragm 833 to prevent exposure of the second plate 819 to potential volatile chemicals in certain applications, where only the variable resistance 993 is thus exposed.

Figure 27C:
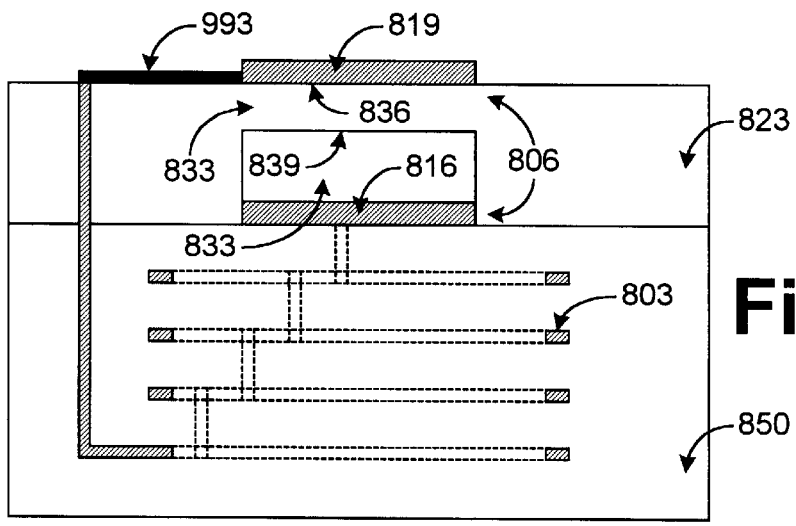
FIG. 27C is a side view of a combination pressure and temperature sensor produced using surface machining techniques with the bulk surface machined inductor coil of FIG. 22 employed as a substrate.

As the resistance of the variable resistor 993 changes, so does the bandwidth of the resonant circuit as discussed previously. Thus, the combination sensor 990 provides independent measurements of pressure and temperature, or pressure and the presence of a chemical species in a particular environment. Note that FIG. 27C illustrates a combination sensor 990a in which the bulk-machined inductor coil assembly 850 is employed in place of the substrate 990 as discussed previously.

Method of Manufacture of Surface Machined Sensors

Figure 28:
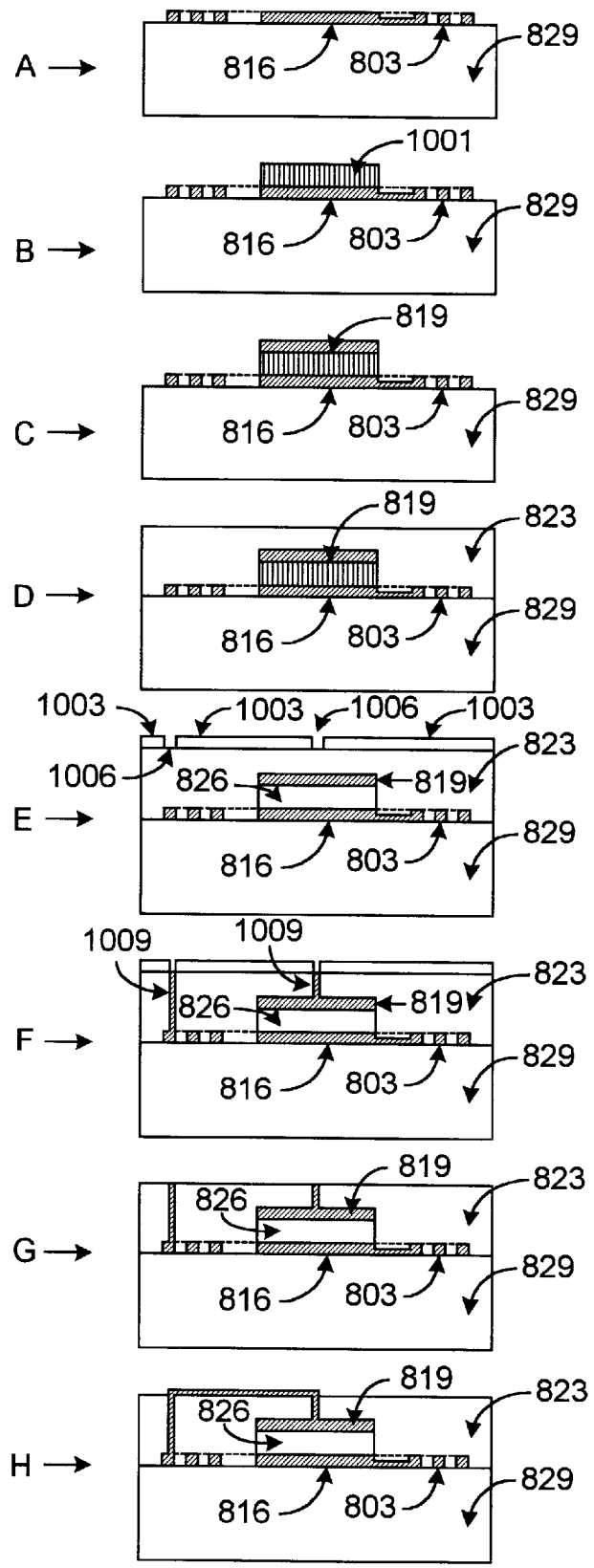
FIG. 28 is a drawing showing an assembly of the temperature sensor of FIGS. 21A and 21B.

Turning to FIG. 28, shown is a progression of steps A–H taken in one exemplary method of manufacturing of the pressure sensor 800 using surface machining techniques. Beginning with step A, the inductor coil 803 and the first plate 816 are placed on the substrate 829 using standard processes such as additive or subtractive photolithography, stencil printing, screen printing, lamination, spin-casting from solution, slurry, or emulsion, or other photolithographic or surface mount processes. Thereafter, in step B, a layer of sacrificial material 1001 is placed over the first plate 816 using stencil printing, screen printing, vapor deposition and photolithography, or other appropriate methods. For example, a full layer of the sacrificial material may be placed over the entire inductor coil 803 and the first plate 816, and then unwanted portions may be eliminated using photolithography or chemical etching. The sacrificial material may also be located in a manner that forms one or more dissolution channels that ultimately allow the sacrificial material to be dissolved and removed as will be discussed.

Next, in step C, the second plate 819 is placed on top of the sacrificial layer 1001 using a suitable deposition process as described above. Then, in step D, the structural layer 823 is formed on top of the entire assembly using a suitable deposition method as described above. Note that the external surface of the structural layer 823 may not be as uniform as shown, depending upon the particular method used to create it. Upon curing or any subsequent processing as required to improve the mechanical properties of structural layer 823, the sacrificial layer 1001 is removed either by heating or by dissolving the same through small access holes created as discussed above, thereby creating the cavity 826. Then, in step E, a masking material 1003 is deposited on the external surface of the structural layer 823 and patterned, leaving holes 1006 as shown. The masking material 1003 may provide a barrier to light in the case of photolithography or may be resistant to chemical etching.

In step F, the assembly is then exposed to light or submersed in etching chemicals and the resulting channels 1009 are created and then filled with a conductor material that is in electrical contact with the inductor coil 803 and the second plate 819. Thus, the structural layer 823 is preferably constructed using a material that will facilitate this etching process. Note that for all of the various embodiments of sensors discussed herein, the steps described herein relative to the creation of such channels 1009 may be undertaken to establish conductive pathways through various structural layers discussed. The etching of the channels will stop at the inductor coil 803 and the second plate 819 since these components are selected so as to not degrade when exposed to light or the etching chemicals; alternatively, the length of the etch can be timed to stop when the correct depth of etching has been achieved. Then in step G, the masking material 1003 is then removed from the surface of the structural layer 823 using a second etching process, etc. Finally, in step H, the conductive pathway 809 is completed to electrically couple the second plate 819 to the inductor coil 803 using an appropriate deposition process as described above. It should be noted that conductive pathway 809 can optionally be covered by an additional deposited layer (not shown) to passivate the pathway and thereby arrive at a fully self-packaged structure. While the above describes the steps taken to manufacture the pressure sensor 800, it is understood that similar steps may be taken with respect to the other sensors discussed herein.

With respect to the various embodiments of the first and second capacitor plates 816 and 819, or 913 and 919, it is noted that they are generally shown as round in shape, however, it is understood that they may be any shape and, may also vary in a third dimension when mounted on a structural layer that is not uniform in thickness, either due to processing constraints or by design, e.g., in the fabrication of corrugations to modify the mechanical properties of the deflecting structural layer(s) in desirable ways, such as to increase linearity and/or flexibility.

Figure 29A:
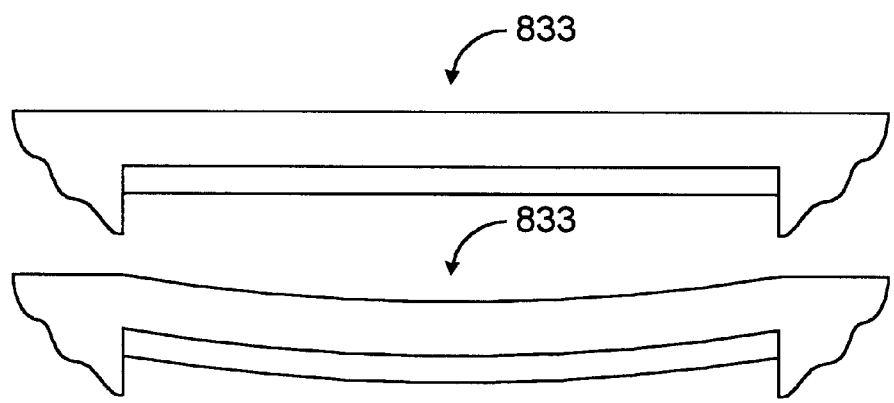
FIG. 29A is a side view of a diaphragm employed in the sensor of FIGS. 21A and 21B.
Figure 29B:
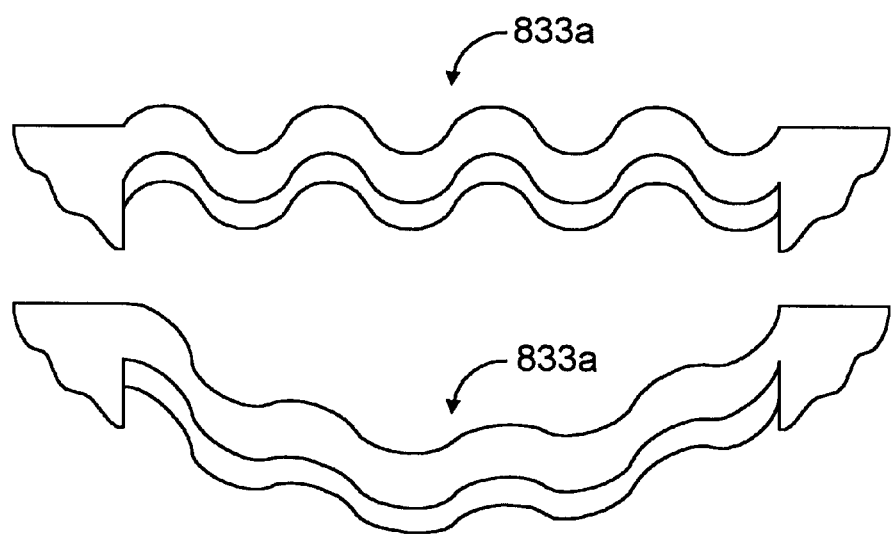
FIG. 29B is a side view of a corrugated diaphragm that may be employed according to an embodiment of the present invention.

With reference to FIGS. 29A and 29B, shown are the diaphragm 833 of FIGS. 21B–F in both a normal state and a deflected state. With reference to FIG. 29B, shown is a corrugated diaphragm 833a according to another embodiment of the present invention. The corrugated diaphragm 833a includes a number of ridges and valleys that provide greater compliance thereto. Thus, the corrugated diaphragm 833a will experience greater deflection once subjected to a comparable amount of force or pressure as compared to the diaphragm 833 of FIG. 29A, as well as increase linearity of the compliance. The corrugated diaphragm 833a may be employed in all of the relevant sensors discussed herein. Note other types of corrugation may be employed other than the peaks and valleys discussed herein, and other types of thickness modification of the structural layer, including touch-down regions, may be incorporated in the structure.

Figure 30A:
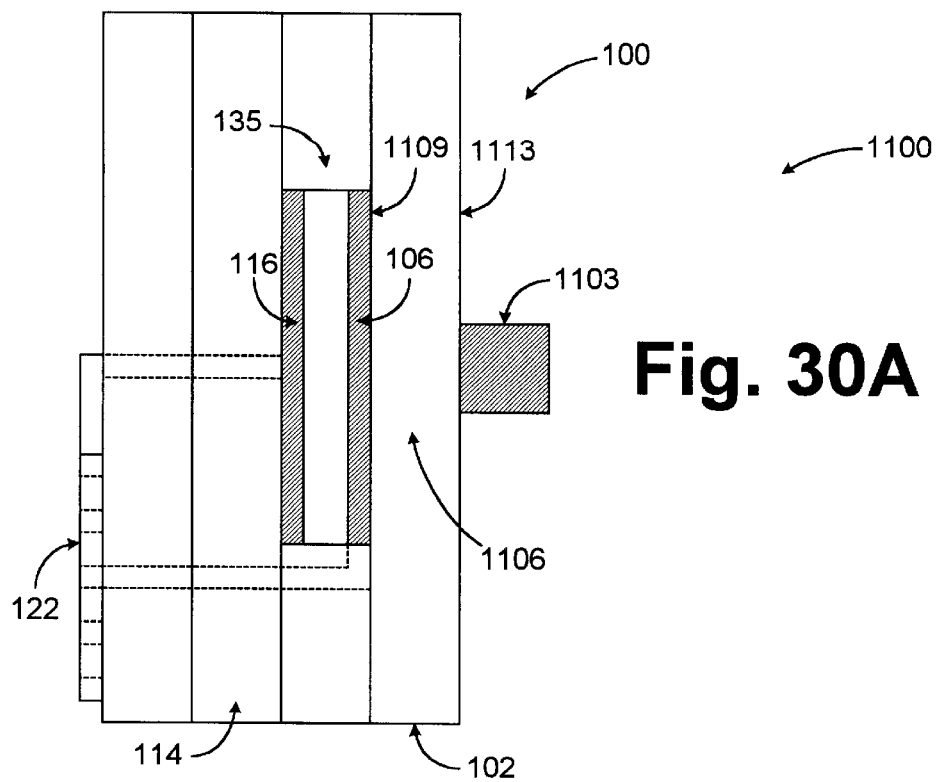
FIGS. 30A and 30B are side views of an acceleration sensor according to another embodiment of the present invention.

Referring next to FIG. 30A, shown is an acceleration sensor 1100 according to another embodiment of the present invention. The acceleration sensor 1100 includes a structure substantially similar to the pressure sensor 100 (FIG. 2) that further comprises a proof mass 1103 that is attached to an exterior surface 1113 of a diaphragm 1106 defined by the first layer 102 as shown. The diaphragm 1106 also includes an interior surface 1109 to which the bottom conductor 106 is affixed as was described with reference to FIGS. 1 and 2. The second conductor 116 is disposed against the third layer 114 as shown, forming the capacitor 135. The structure of the pressure sensor of FIGS. 3 and 4 could also be used in the place of the structure of the pressure sensor 100 as shown in FIG. 30A. Although the proof mass 1103 shown as being affixed to the exterior surface 1113, it may be possible that the proof mass 1103 be attached to the interior surface 1109, for example, between the diaphragm 1106 and the bottom conductor 106. Also, the proof mass 1103 may be embedded within the diaphragm 1106, with a portion of the proof mass 1103 being exposed, or the proof mass 1103 may be entirely encased within the diaphragm 1106. In addition, the bulk machined inductor coil assembly 850 (FIG. 22) may be employed in place of the inductor coil 122.

Figure 30B:
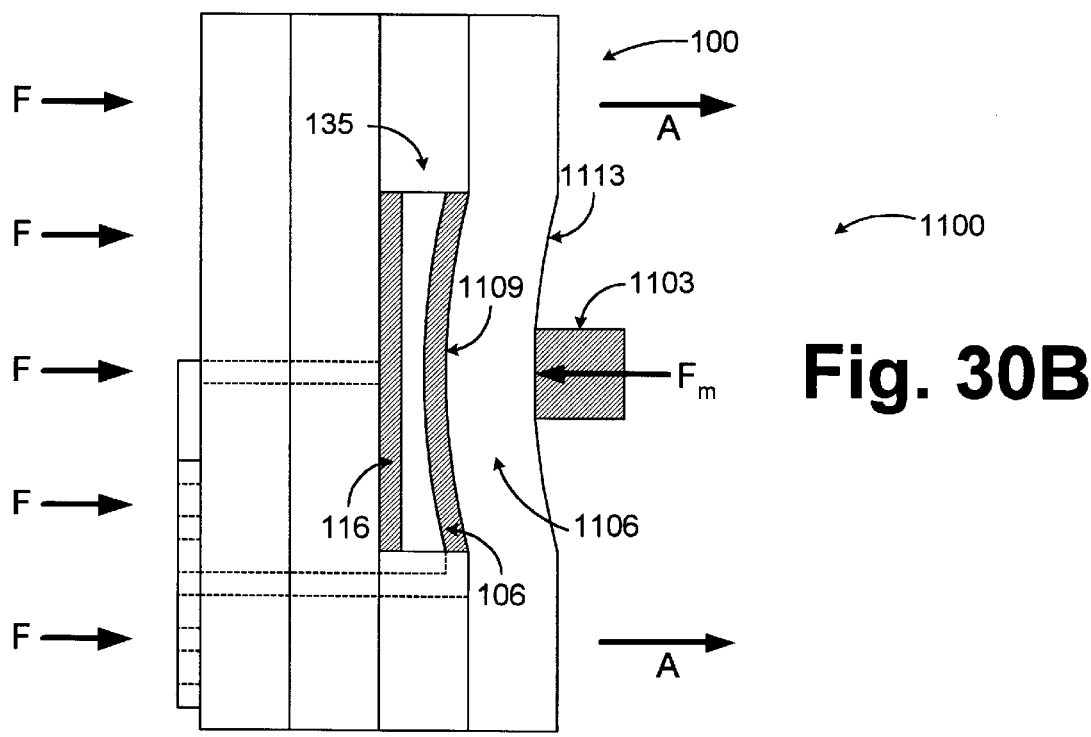

With reference to FIG. 30B, shown is the operation of the acceleration sensor 1100. The acceleration sensor 1100 is subjected to an acceleration A, that causes the proof mass 1103 to exert a force $F_m$ on the diaphragm 1106. Neglecting the mass of the diaphragm, the force $F_m$ is generally equal to the acceleration A multiplied by the mass of the proof mass 1103 (F=ma). The diaphragm 1106 is movable when subjected to a force applied to the exterior surface 1113. Thus, the force $F_m$ causes the diaphragm 1103 to deflect inward, thereby moving the conductors 116 and 106 closer together. In this manner, the capacitance of the capacitor 135 formed by the conductors 116 and 106 is variable with the movement of the diaphragm 1106. Therefore, ultimately the capacitance of the capacitor 135 is variable with the acceleration of the acceleration sensor 1100.

Figure 31:
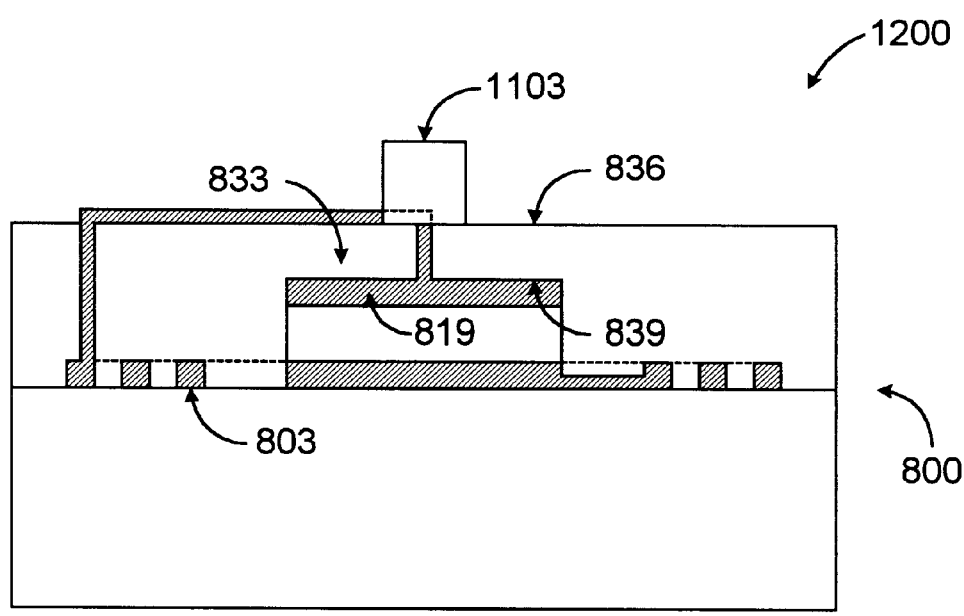
FIG. 31 is a side view of a second acceleration sensor according to another embodiment of the present invention.

Finally, with reference to FIG. 31, shown is a second acceleration sensor 1200 according to another embodiment of the present invention. The acceleration sensor 1200 includes much of the structure of the pressure sensor 800 of FIGS. 21A and 21B including the diaphragm 833 with the exterior surface 836 and the interior surface 839. A proof mass 1103 is disposed on the exterior surface 836 as shown. Note that the proof mass 1103 may also be placed on the interior surface 839 under the second plate 819. The proof mass 1103 may be embedded in the diaphragm 833 with part of the proof mass 1103 exposed, or the proof mass 1103 may be entirely encased within the diaphragm 833. The operation of the acceleration sensor 1200 is similar to the operation of the acceleration sensor 1100 as described previously. In addition, the diaphragms 1106 (FIG. 30A) and 833 of the pressure sensors 1100 (FIG. 30A) and 1200 may act as the proof mass 1103 itself without the actual addition of the proof mass 1103. Also, the bulk machined inductor coil assembly 850 may be employed in place of the inductor coil 803 in a similar manner as the pressure sensor 800b of FIG. 23.

Finally, it is noted that the sensors and excitation systems as discussed herein may be employed in a multitude of applications for sensing pressure, acceleration, force, temperature, and other physical properties. Such applications include, for example, high temperature applications and low temperature applications. Specific applications might include, for example, medical applications in which physical properties within or outside of the body may be sensed for various medical purposes. The sensors as discussed herein may be employed in corrosive environments or in the presence of harsh chemicals, etc. It is understood that the embodiments described herein are thus not limited to any particular environment or medium, but the principles discussed herein are applicable to the wide variety of environments or mediums in existence.

Many variations and modifications may be made to the preferred embodiment of the invention without departing substantially from the spirit and principles of the invention. All such modifications and variations are intended to be included herein within the scope of the present invention, as defined by the following claims.

What is claimed is:

1. A sensor for wirelessly determining physical properties of a medium, comprising:

a resonant circuit having a capacitor and an inductor;

a substrate;

a structural layer placed over the substrate, the structural layer defining a cavity with a diaphragm having an external surface and an internal surface, the diaphragm being moveable in response to a pressure applied to the external surface;

the capacitor having at least a first plate positioned on the diaphragm and a second plate positioned opposite the first plate with the cavity therebetween, wherein a capacitance of the capacitor is variable with a movement of the diaphragm; and the inductor having a first end coupled to the first plate and a second end coupled to the second plate, the inductor inducing a current in the resonant circuit when exposed to a time-varying electromagnetic field.

2. The sensor of claim 1, wherein the first plate is positioned on the external surface of the diaphragm.

3. The sensor of claim 1, wherein the first plate is positioned on the internal surface of the diaphragm.

4. The sensor of claim 1, wherein the inductor is positioned on an external surface of the structural material.

5. The sensor of claim 1, wherein the inductor is positioned on the substrate and covered by the structural material.

6. The sensor of claim 1, wherein the inductor is located within the substrate.

7. The sensor of claim 6, wherein the substrate further comprises:

a number of stacked layers; and the inductor comprises a number of electrically conductive rings coupled in series, wherein one of the electrically conductive rings is located on each of the stacked layers, the electrically conductive rings forming a coil.

8. A sensor for wirelessly determining physical properties of a medium, comprising:

a resonant circuit having a capacitor and an inductor;

a substrate;

a first plate located on the substrate;

a structural layer placed over the substrate, the structural layer covering the first plate, the structural layer having a permittivity that changes with temperature;

a second plate placed over the structural layer opposite the first plate, the first and second plates forming the capacitor; and the inductor having a first end coupled to the first plate and a second end coupled to the second plate, the inductor inducing a current in the resonant circuit when exposed to a time-varying electromagnetic field.

9. The sensor of claim 8, the resonant circuit further comprising a resistor, the resistor being variable with a presence of a chemical species.

10. The sensor of claim 8, wherein the inductor is positioned on an external surface of the structural material.

11. The sensor of claim 8, wherein the inductor is positioned on the substrate and covered by the structural material.

12. The sensor of claim 8, wherein the inductor is located within the substrate.

13. The sensor of claim 12, wherein the substrate further comprises:

a number of stacked layers; and the inductor further comprising a number of electrically conductive rings coupled in series, wherein one of the electrically conductive rings is located on each of the stacked layers, the electrically conductive rings forming a coil.

14. A sensor for wirelessly determining physical properties of a medium, comprising:

a resonant circuit having a capacitor and an inductor;

a first layer having a first plate located thereon;

a second layer having a second plate located thereon, the second plate being positioned opposite the first plate, the first and second plates forming the capacitor, and, the first and second layers having a permittivity that changes with temperature; and the inductor having a first end coupled to the first plate and a second end coupled to the second plate, the inductor inducing a current in the resonant circuit when exposed to a time-varying electromagnetic field.

15. The sensor of claim 14, further comprising:

a number of stacked layers; and the inductor further comprising a number of electrically conductive rings coupled in series, wherein one of the electrically conductive rings is located on each of the stacked layers, the electrically conductive rings forming a coil.

16. A sensor for wirelessly determining physical properties of a medium, comprising:

a resonant circuit having a capacitor, an inductor, and a resistor;

a substrate;

a first plate located on the substrate;

a structural layer placed over the substrate, the structural layer covering the first plate, the structural layer having a permittivity that changes with temperature;

a second plate placed over the structural layer and adjacent to the first plate, the first and second plates forming the capacitor;

the resistor being variable in response to a change in temperature; and the inductor inducing a current in the resonant circuit when exposed to a time-varying electromagnetic field.

17. The sensor of claim 16, wherein the inductor is positioned on an external surface of the structural material.

18. The sensor of claim 16, wherein the inductor is positioned on the substrate and covered by the structural material.

19. The sensor of claim 16, wherein the inductor is located within the substrate.

20. The sensor of claim 16, wherein the substrate further comprises:

a number of stacked layers; and the inductor comprises a number of electrically conductive rings coupled in series, wherein one of the electrically conductive rings is located on each of the stacked layers, the electrically conductive rings forming a coil.

21. A sensor for wirelessly determining physical properties of a medium, comprising:

a resonant circuit having a capacitor, an inductor, and a resistor;

a first layer having a first plate located thereon;

a second layer having a second plate located thereon, the second plate being positioned opposite to the first plate, the first and second plates forming the capacitor;

the resistor being variable in response to a change in temperature; and the inductor inducing a current in the resonant circuit when exposed to a time-varying electromagnetic field.

22. The sensor of claim 21, further comprising:

a number of stacked layers; and the inductor further comprising a number of electrically conductive rings coupled in series, wherein one of the electrically conductive rings is located on each of the stacked layers, the electrically conductive rings forming a coil.

23. A sensor for wirelessly determining physical properties of a medium, comprising:

a resonant circuit having a capacitor, an inductor, and a resistor;

a substrate;

a first plate located on the substrate;

a structural layer placed over the substrate, the structural layer covering the first plate, the structural layer having a permittivity that changes with temperature;

a second plate placed over the structural layer and adjacent to the first plate, the first and second plates forming the capacitor;

the resistor being variable in response to a presence of a chemical species; and the inductor inducing a current in the resonant circuit when exposed to a time-varying electromagnetic field.

24. The sensor of claim 23, wherein the inductor is positioned on an external surface of the structural material.

25. The sensor of claim 23, wherein the inductor is positioned on the substrate and covered by the structural material.

26. The sensor of claim 23, wherein the inductor is located within the substrate.

27. The sensor of claim 23, wherein the substrate further comprises:
   a number of stacked layers; and
   the inductor comprises a number of electrically conductive rings coupled in series, wherein one of the electrically conductive rings is located on each of the stacked layers, the electrically conductive rings forming a coil.

28. A sensor for wirelessly determining physical properties of a medium, comprising:
   a resonant circuit having a capacitor, an inductor, and a resistor;
   a first layer having a first plate located thereon;
   a second layer having a second plate located thereon, the second plate being positioned opposite to the first plate, the first and second plates forming the capacitor;
   the resistor being variable in response to a presence of a chemical species; and
   the inductor inducing a current in the resonant circuit when exposed to a time-varying electromagnetic field.

29. The sensor of claim 28, further comprising:
   a number of stacked layers; and
   the inductor further comprising a number of electrically conductive rings coupled in series, wherein one of the electrically conductive rings is located on each of the stacked layers, the electrically conductive rings forming a coil.

30. A sensor for wirelessly determining physical properties of a medium, comprising:
   a substrate;
   a first resonant circuit having a first capacitor and a first inductor;
   a second resonant circuit having a second capacitor and a second inductor;
   a structural layer placed over the substrate, the structural layer defining a cavity with a diaphragm having an external surface and an internal surface, the diaphragm being moveable in response to a pressure applied to the external surface;
   the first capacitor having a first plate positioned on the diaphragm and a second plate positioned opposite the first plate with the cavity therebetween, wherein a capacitance of the first capacitor is variable with a movement of the diaphragm;
   the second capacitor having a third plate located on the substrate, and a fourth plate located opposite the third plate with an amount of a dielectric material therebetween, the dielectric material having a permittivity that changes with temperature; and
   the first and second inductors inducing a current in the first and second resonant circuits when exposed to a time-varying electromagnetic field.

31. The sensor of claim 30, wherein the first plate is positioned on the external surface of the diaphragm.

32. The sensor of claim 30, wherein the first plate is positioned on the internal surface of the diaphragm.

33. The sensor of claim 30, wherein the substrate further comprises:
   a number of stacked layers; and
   the first inductor further comprising a number of electrically conductive rings coupled in series, wherein one of the electrically conductive rings is located on each of the stacked layers, the electrically conductive rings forming a coil.

34. The sensor of claim 30, wherein the substrate further comprises:
   a number of stacked layers; and
   the second inductor further comprising a number of electrically conductive rings coupled in series, wherein one of the electrically conductive rings is located on each of the stacked layers, the electrically conductive rings forming a coil.

35. A sensor for wirelessly determining physical properties of a medium, comprising:
   a first resonant circuit having a first capacitor and a first inductor;
   a second resonant circuit having a second capacitor and a second inductor;
   a first layer having a first plate;
   at least one middle layer having a hole;
   a second layer having a second plate, wherein the first layer, middle layer, and the second layer are stacked wherein the first plate is located opposite the second plate with the hole therebetween, wherein the first and second plates define the first capacitor, the first capacitor having a capacitance that varies with a pressure applied to the sensor;
   the second capacitor comprising a third plate and a fourth plate located opposite the third plate with an amount of a dielectric material therebetween, the dielectric material having a permittivity that changes with temperature; and
   the first and second inductors inducing a current in the first and second resonant circuits when exposed to a time-varying electromagnetic field.

36. A sensor for wirelessly determining physical properties of a medium, comprising:
   a resonant circuit having a capacitor, an inductor, and a resistor;
   a substrate;
   a structural layer placed over the substrate, the structural layer defining a cavity with a diaphragm having an external surface and an internal surface, the diaphragm being moveable in response to a pressure applied to the external surface;
   the capacitor having at least a first plate positioned on the diaphragm and a second plate positioned opposite the first plate with the cavity therebetween, wherein a capacitance of the capacitor is variable with a movement of the diaphragm;
   the resistor being variable in response to a change in temperature; and
   the inductor inducing a current in the resonant circuit when exposed to a time-varying electromagnetic field.

37. The sensor of claim 36, wherein the first plate is positioned on the external surface of the diaphragm.

38. The sensor of claim 36, wherein the first plate is positioned on the internal surface of the diaphragm.

39. The sensor of claim 36, wherein the inductor is positioned on an external surface of the structural material.

40. The sensor of claim 36, wherein the inductor is positioned on the substrate and covered by the structural material.

41. The sensor of claim 36, wherein the inductor is located within the substrate.

42. The sensor of claim 36, wherein the substrate further comprises:

a number of stacked layers; and the inductor comprises a number of electrically conductive rings coupled in series, wherein one of the electrically conductive rings is located on each of the stacked layers, the electrically conductive rings forming a coil.

43. A sensor for wirelessly determining physical properties of a medium, comprising:

a resonant circuit having a capacitor, an inductor, and a resistor;

a first layer having a first plate;

at least one middle layer having a hole;

a second layer having a second plate, wherein the first layer, middle layer, and the second layer are stacked wherein the first plate is located opposite the second plate with the hole therebetween, wherein the first and second plates define the capacitor, the capacitor having a capacitance that varies with a pressure applied to the sensor;

the resistor being variable in response to a change in temperature; and the inductor inducing a current in the resonant circuit when exposed to a time-varying electromagnetic field.

44. The sensor of claim 43, further comprising:

a number of the middle layers; and the inductor comprises a number of electrically conductive rings coupled in series, wherein one of the electrically conductive rings is located on each of the middle layers, the electrically conductive rings forming a coil.

45. A sensor for wirelessly determining physical properties of a medium, comprising:

a resonant circuit having a capacitor, an inductor, and a resistor;

a substrate;

a structural layer placed over the substrate, the structural layer defining a cavity with a diaphragm having an external surface and an internal surface, the diaphragm being moveable in response to a pressure applied to the external surface;

the capacitor having at least a first plate positioned on the diaphragm and a second plate positioned opposite the first plate with the cavity therebetween, wherein a capacitance of the capacitor is variable with a movement of the diaphragm;

the resistor being variable in response to a presence of a chemical species; and the inductor inducing a current in the resonant circuit when exposed to a time-varying electromagnetic field.

46. The sensor of claim 45, wherein the first plate is positioned on the external surface of the diaphragm.

47. The sensor of claim 45, wherein the first plate is positioned on the internal surface of the diaphragm.

48. The sensor of claim 45, wherein the inductor is positioned on the external surface of the structural material.

49. The sensor of claim 45, wherein the inductor is positioned on the substrate and covered by the structural material.

50. The sensor of claim 45, wherein the inductor is located within the substrate.

51. The sensor of claim 45, wherein the substrate further comprises:

a number of stacked layers; and the inductor comprises a number of electrically conductive rings coupled in series, wherein one of the electrically conductive rings is located on each of the stacked layers, the electrically conductive rings forming a coil.

52. A sensor for wirelessly determining physical properties of a medium, comprising:

a resonant circuit having a capacitor, an inductor, and a resistor;

a first layer having a first plate;

at least one middle layer having a hole;

a second layer having a second plate, wherein the first layer, middle layer, and the second layer are stacked wherein the first plate is located opposite the second plate with the hole therebetween, wherein the first and second plates define the capacitor, the capacitor having a capacitance that varies with a pressure applied to the sensor;

the resistor being variable in response to a presence of a chemical species; and the inductor inducing a current in the resonant circuit when exposed to a time-varying electromagnetic field.

53. The sensor of claim 52, further comprising:

a number of the middle layers; and the inductor comprises a number of electrically conductive rings coupled in series, wherein one of the electrically conductive rings is located on each of the middle layers, the electrically conductive rings forming a coil.

54. An acceleration sensor, comprising:

a resonant circuit having a capacitor and an inductor;

a substrate;

a structural layer placed over the substrate, the structural layer defining a cavity with a diaphragm having an external surface and an internal surface, the diaphragm being moveable in response to an acceleration experienced by the acceleration sensor;

the capacitor having at least a first plate positioned on the diaphragm and a second plate positioned opposite the first plate with the cavity therebetween, wherein a capacitance of the capacitor is variable with a movement of the diaphragm; and the inductor having a first end coupled to the first plate and a second end coupled to the second plate, the inductor inducing a current in the resonant circuit when exposed to a time-varying electromagnetic field.

55. The sensor of claim 54, further comprising a proof mass attached to the external surface of the diaphragm.

56. The sensor of claim 54, further comprising a proof mass attached to the internal surface of the diaphragm.

57. The sensor of claim 54, further comprising a proof mass embedded in the diaphragm.

58. The sensor of claim 54, further comprising a proof mass encased in the diaphragm.

59. An acceleration sensor, comprising:

a resonant circuit having a capacitor and an inductor;

a first layer having a first plate;

at least one middle layer having a hole;

a second layer having a second plate, wherein the first layer, middle layer, and the second layer are stacked, the first plate being located opposite the second plate with the hole therebetween, wherein the first and second plates define the capacitor, the first plate defining a diaphragm that is moveable in response to an acceleration experienced by the acceleration sensor, the capacitor having a capacitance that varies with a movement of the diaphragm; and the inductor inducing a current in the resonant circuit when exposed to a time-varying electromagnetic field.

60. The acceleration sensor of claim 59, further comprising:

a number of the middle layers; and the inductor comprises a number of electrically conductive rings coupled in series, wherein one of the electrically conductive rings is located on each of the middle layers, the electrically conductive rings forming a coil.

61. The sensor of claim 59, further comprising a proof mass attached to an external surface of the diaphragm.

62. The sensor of claim 59, further comprising a proof mass attached to an internal surface of the diaphragm.

63. The sensor of claim 59, further comprising a proof mass embedded in the diaphragm.

64. The sensor of claim 59, further comprising a proof mass encased in the diaphragm.

* * * * *

UNITED STATES PATENT AND TRADEMARK OFFICE
CERTIFICATE OF CORRECTION

PATENT NO. : 6,278,379 B1
DATED : August 21, 2001
INVENTOR(S) : Allen et al.

Page 1 of 1

It is certified that error appears in the above-identified patent and that said Letters Patent is hereby corrected as shown below:

<u>Column 13,</u>
Line 35, after the word "sensors", delete the word "IOb", and substitute therefor -- 100b --.

Signed and Sealed this

Twelfth Day of March, 2002

Attest:

*Attesting Officer*

JAMES E. ROGAN
*Director of the United States Patent and Trademark Office*